(12) United States Patent
Bone et al.

(10) Patent No.: US 9,958,640 B2
(45) Date of Patent: May 1, 2018

(54) OPTICAL IMAGING LENS

(71) Applicant: GENIUS ELECTRONIC OPTICAL CO., LTD., Taichung (TW)

(72) Inventors: Matthew Bone, Fujian (CN); Feng Li, Fujian (CN); Mao Zong Lin, Fujian (CN)

(73) Assignee: GeniuS Electronic Optical (Xiamen) Co., Ltd, Xiamen (CN)

( * ) Notice: Subject to any disclaimer, the term of this patent is extended or adjusted under 35 U.S.C. 154(b) by 0 days. days.

(21) Appl. No.: 15/213,134

(22) Filed: Jul. 18, 2016

(65) Prior Publication Data

US 2018/0011290 A1 Jan. 11, 2018

(30) Foreign Application Priority Data

Jul. 5, 2016 (CN) .......................... 2016 1 0523506

(51) Int. Cl.
| | | |
|---|---|---|
| G02B 13/18 | (2006.01) | |
| G02B 3/02 | (2006.01) | |
| G02B 9/34 | (2006.01) | |
| G02B 13/00 | (2006.01) | |
| G02B 9/58 | (2006.01) | |
| G02B 27/00 | (2006.01) | |

(52) U.S. Cl.
CPC ............. *G02B 13/004* (2013.01); *G02B 9/58* (2013.01); *G02B 27/0025* (2013.01)

(58) Field of Classification Search
CPC ........... G02B 13/004; G02B 9/34; G02B 9/58
USPC .......................... 359/715, 753, 771, 781, 782
See application file for complete search history.

(56) References Cited

U.S. PATENT DOCUMENTS

2016/0161706 A1* 6/2016 Liao ..................... G02B 13/004
359/740

FOREIGN PATENT DOCUMENTS

KR 20130054007 A * 5/2013

* cited by examiner

*Primary Examiner* — William Choi
(74) *Attorney, Agent, or Firm* — Baker & McKenzie LLP

(57) ABSTRACT

Present embodiments provide for an optical imaging lens. The optical imaging lens may comprise four lens elements positioned sequentially from an object side to an image side. Through controlling the convex or concave shape of the surfaces of the lens elements and designing parameters satisfying at least one inequality, the optical imaging lens may exhibit better optical characteristics and the total length of the optical imaging lens may be shortened.

19 Claims, 40 Drawing Sheets

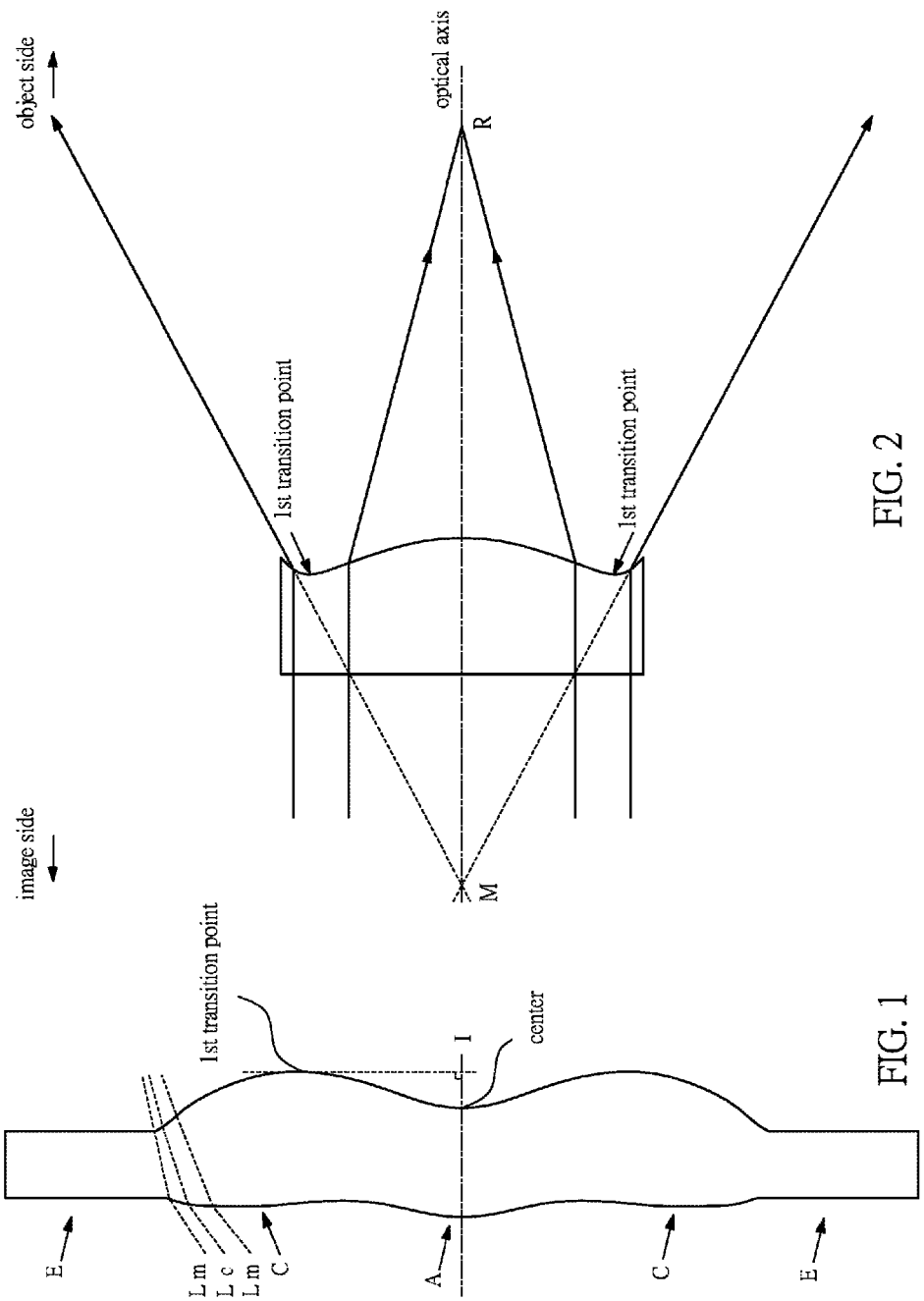

| EFL = 1.9051 mm , HFOV= 73.058deg. , TTL = 10.0756mm , Image height = 2.113mm , Fno = 2.9 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 111 | 1st lens element | 70.0000 | 0.6000 | 1.545 | 55.987 | -3.850 | plastic |
| 112 | | 2.0020 | 2.9003 | | | | |
| 121 | 2nd lens element | 20.0288 | 1.8194 | 1.545 | 55.987 | 6.159 | plastic |
| 122 | | -3.8354 | 0.2250 | | | | |
| 100 | aperture stop | ∞ | 0.1800 | | | | |
| 131 | 3rd lens element | 2.2612 | 1.6792 | 1.517 | 64.198 | 3.296 | glass |
| 132 | | -4.9007 | 0.9982 | | | | |
| 141 | 4th lens element | -6.7069 | 0.4500 | 1.661 | 20.401 | -4.866 | plastic |
| 142 | | 5.9327 | 0.5523 | | | | |
| 151 | Cover glass | ∞ | 0.3000 | 1.517 | 64.167 | | glass |
| 152 | | | 0.3711 | | | | |
| 160 | image plane | ∞ | 0.0000 | | | | |

FIG.8

| Aspherical parameters | | | | |
|---|---|---|---|---|
| Surface# | 111 | 112 | 121 | 122 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -3.6541E-03 | -2.1366E-02 | -5.0354E-03 |
| $a_6$ | 0.0000E+00 | -1.3259E-03 | 2.5686E-03 | -1.5202E-02 |
| $a_8$ | 0.0000E+00 | 1.6294E-04 | 8.5556E-05 | 3.6665E-02 |
| $a_{10}$ | 0.0000E+00 | 0.0000E+00 | 0.0000E+00 | -2.1670E-02 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 131 | 132 | 141 | 142 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -2.1023E-01 | -1.3004E-01 |
| $a_6$ | 0.0000E+00 | 0.0000E+00 | 4.1593E-02 | 3.0193E-02 |
| $a_8$ | 0.0000E+00 | 0.0000E+00 | -6.6504E-02 | -1.6610E-02 |
| $a_{10}$ | 0.0000E+00 | 0.0000E+00 | 0.0000E+00 | 2.8246E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.9

| EFL = 1.8559 mm, HFOV= 73.046deg., TTL = 9.509mm, Image height = 2.114mm, Fno = 2.847 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 211 | 1st lens element | 70.0000 | 0.6000 | 1.5445 | 55.9870 | -3.6930 | plastic |
| 212 | | 1.9227 | 2.6368 | | | | |
| 221 | 2nd lens element | -11.0244 | 1.2953 | 1.5445 | 55.9870 | 5.3770 | plastic |
| 222 | | -2.3819 | 0.2250 | | | | |
| 200 | aperture stop | ∞ | 0.1800 | | | | |
| 231 | 3rd lens element | 4.4528 | 1.6362 | 1.5168 | 64.1983 | 3.4120 | glass |
| 232 | | -2.5007 | 1.5245 | | | | |
| 241 | 4th lens element | -5.6290 | 0.4500 | 1.6606 | 20.4012 | -4.6660 | plastic |
| 242 | | 6.5168 | 0.2908 | | | | |
| 251 | Cover glass | ∞ | 0.3000 | 1.5168 | 64.1673 | | glass |
| 252 | | | 0.3701 | | | | |
| 260 | image plane | ∞ | 0.0000 | | | | |

FIG.12

| Aspherical parameters | | | | |
|---|---|---|---|---|
| Surface# | 211 | 212 | 221 | 222 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -5.8477E-03 | -4.3734E-02 | -5.6634E-04 |
| $a_6$ | 0.0000E+00 | 3.4980E-04 | 3.5162E-03 | -1.2827E-03 |
| $a_8$ | 0.0000E+00 | -4.1882E-04 | -3.9000E-04 | 1.3771E-02 |
| $a_{10}$ | 0.0000E+00 | 0.0000E+00 | 0.0000E+00 | -1.0834E-02 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 231 | 232 | 241 | 242 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.5235E-01 | -9.9568E-02 |
| $a_6$ | 0.0000E+00 | 0.0000E+00 | 1.9942E-02 | 2.2686E-02 |
| $a_8$ | 0.0000E+00 | 0.0000E+00 | -1.1476E-02 | -6.1549E-03 |
| $a_{10}$ | 0.0000E+00 | 0.0000E+00 | 0.0000E+00 | 6.1890E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.13

| EFL = 2.4542 mm,HFOV= 50.019deg., TTL = 6.0198mm,Image height = 1.803mm,Fno = 2.9195 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 311 | 1st lens element | 70.0000 | 0.2117 | 1.5445 | 55.9870 | -3.6560 | plastic |
| 312 | | 1.9074 | 1.0551 | | | | |
| 321 | 2nd lens element | -7.6695 | 0.7337 | 1.5445 | 55.9870 | 3.8240 | plastic |
| 322 | | -1.6737 | 0.0132 | | | | |
| 300 | aperture stop | ∞ | 0.0024 | | | | |
| 331 | 3rd lens element | 4.6737 | 1.0051 | 1.5168 | 64.1983 | 2.9040 | glass |
| 332 | | -2.0101 | 1.1595 | | | | |
| 341 | 4th lens element | -2.0978 | 0.6567 | 1.6606 | 20.4012 | -3.2880 | plastic |
| 342 | | 20501722.2030 | 0.5075 | | | | |
| 351 | Cover glass | ∞ | 0.3000 | 1.5168 | 64.1673 | | glass |
| 352 | | | 0.3750 | | | | |
| 360 | image plane | ∞ | 0.0000 | | | | |

FIG.16

| Aspherical parameters | | | | |
|---|---|---|---|---|
| Surface# | 311 | 312 | 321 | 322 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 6.0419E-02 | -1.2741E-01 | -3.6498E-02 |
| $a_6$ | 0.0000E+00 | 2.0216E-02 | -3.5125E-02 | -6.8164E-02 |
| $a_8$ | 0.0000E+00 | 2.6558E-02 | -8.6725E-02 | 1.1022E-01 |
| $a_{10}$ | 0.0000E+00 | 0.0000E+00 | 0.0000E+00 | -9.5144E-02 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 331 | 332 | 341 | 342 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.4794E-01 | -1.4244E-01 |
| $a_6$ | 0.0000E+00 | 0.0000E+00 | 2.9611E-03 | 4.8215E-02 |
| $a_8$ | 0.0000E+00 | 0.0000E+00 | 3.7468E-02 | -9.5342E-03 |
| $a_{10}$ | 0.0000E+00 | 0.0000E+00 | 0.0000E+00 | 3.0015E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.17

| EFL = 1.8697 mm, HFOV= 73.074deg., TTL = 11.9495mm, Image height = 2.112mm, Fno = 2.837 |||||||
|---|---|---|---|---|---|---|
| Surface# | | Radius (mm) | Thickness (mm) | Refractive index | Abbe number | Focus (mm) | Material |
| - | Object | ∞ | 600.0000 | | | | |
| 411 | 1st lens element | 70.0000 | 0.6000 | 1.5445 | 55.9870 | -4.7800 | plastic |
| 412 | | 2.4682 | 3.5921 | | | | |
| 421 | 2nd lens element | -18.3362 | 2.4886 | 1.5445 | 55.9870 | 7.6240 | plastic |
| 422 | | -3.5053 | 0.2250 | | | | |
| 400 | aperture stop | ∞ | 0.1800 | | | | |
| 431 | 3rd lens element | 2.6654 | 2.1485 | 1.5168 | 64.1983 | 3.6840 | glass |
| 432 | | -4.6270 | 1.3101 | | | | |
| 441 | 4th lens element | -7.1891 | 0.4500 | 1.6606 | 20.4012 | -4.8200 | plastic |
| 442 | | 5.5054 | 0.2851 | | | | |
| 451 | Cover glass | ∞ | 0.3000 | 1.5168 | 64.1673 | | glass |
| 452 | | | 0.3701 | | | | |
| 460 | image plane | ∞ | 0.0000 | | | | |

FIG.20

| Aspherical parameters | | | | |
|---|---|---|---|---|
| Surface# | 411 | 412 | 421 | 422 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -2.9367E-03 | -1.3240E-02 | 1.9501E-03 |
| $a_6$ | 0.0000E+00 | 1.7539E-04 | 6.3289E-04 | -2.4964E-03 |
| $a_8$ | 0.0000E+00 | -8.5577E-05 | 4.0006E-05 | 6.1519E-03 |
| $a_{10}$ | 0.0000E+00 | 0.0000E+00 | 0.0000E+00 | -3.5511E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 431 | 432 | 441 | 442 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.6228E-01 | -1.1150E-01 |
| $a_6$ | 0.0000E+00 | 0.0000E+00 | 2.7288E-02 | 2.9734E-02 |
| $a_8$ | 0.0000E+00 | 0.0000E+00 | -1.5735E-02 | -8.7012E-03 |
| $a_{10}$ | 0.0000E+00 | 0.0000E+00 | 0.0000E+00 | 9.6593E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.21

| EFL = 1.8545 mm，HFOV= 73.011deg.， TTL = 8.7314mm，Image height = 2.097mm，Fno = 2.8487 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 511 | 1st lens element | 72.6934 | 0.3548 | 1.5445 | 55.9870 | -3.2460 | plastic |
| 512 | | 1.6992 | 1.6915 | | | | |
| 521 | 2nd lens element | -15.0369 | 1.8977 | 1.5445 | 55.9870 | 5.1190 | plastic |
| 522 | | -2.4262 | 0.2386 | | | | |
| 500 | aperture stop | ∞ | 0.1278 | | | | |
| 531 | 3rd lens element | 3.4413 | 1.5249 | 1.5168 | 64.1983 | 3.3450 | glass |
| 532 | | -2.8747 | 1.5164 | | | | |
| 541 | 4th lens element | -5.5662 | 0.4290 | 1.6606 | 20.4012 | -5.4020 | plastic |
| 542 | | 9.3261 | 0.2806 | | | | |
| 551 | Cover glass | ∞ | 0.3000 | 1.5168 | 64.1673 | | glass |
| 552 | | | 0.3700 | | | | |
| 560 | image plane | ∞ | 0.0000 | | | | |

FIG.24

| Aspherical parameters | | | | |
|---|---|---|---|---|
| Surface# | 511 | 512 | 521 | 522 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -1.0963E-02 | -3.9451E-02 | 3.4663E-03 |
| $a_6$ | 0.0000E+00 | 3.1262E-05 | 3.2930E-04 | -2.0860E-03 |
| $a_8$ | 0.0000E+00 | -1.0050E-03 | -4.2516E-04 | 9.0461E-03 |
| $a_{10}$ | 0.0000E+00 | 0.0000E+00 | 0.0000E+00 | -6.6856E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 531 | 532 | 541 | 542 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.5788E-01 | -9.4149E-02 |
| $a_6$ | 0.0000E+00 | 0.0000E+00 | 1.7705E-02 | 1.9205E-02 |
| $a_8$ | 0.0000E+00 | 0.0000E+00 | -1.3077E-02 | -5.7469E-03 |
| $a_{10}$ | 0.0000E+00 | 0.0000E+00 | 0.0000E+00 | 6.1148E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.25

| \multicolumn{7}{|c|}{EFL = 2.2165 mm, HFOV= 73.01deg., TTL = 8.8772mm, Image height = 2.637mm, Fno = 2.8486} |
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 611 | 1st lens element | 84.7385 | 0.4076 | 1.5445 | 55.9870 | -3.3570 | plastic |
| 612 | | 1.7618 | 1.8032 | | | | |
| 621 | 2nd lens element | -3.0017 | 1.1020 | 1.5445 | 55.9870 | 12.4640 | plastic |
| 622 | | -2.3380 | 0.1000 | | | | |
| 600 | aperture stop | ∞ | -0.0500 | | | | |
| 631 | 3rd lens element | 3.2968 | 1.4187 | 1.5168 | 64.1983 | 3.4460 | glass |
| 632 | | -3.2152 | 2.1139 | | | | |
| 641 | 4th lens element | 5.1809 | 0.3776 | 1.6606 | 20.4012 | -32.3000 | plastic |
| 642 | | 4.0226 | 0.9341 | | | | |
| 651 | Cover glass | ∞ | 0.3000 | 1.5168 | 64.1673 | | glass |
| 652 | | | 0.3700 | | | | |
| 660 | image plane | ∞ | 0.0000 | | | | |

FIG.28

| Aspherical parameters | | | | |
|---|---|---|---|---|
| Surface# | 611 | 612 | 621 | 622 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 3.9918E-03 | -3.3376E-02 | -1.2769E-02 |
| $a_6$ | 0.0000E+00 | 2.4020E-03 | -5.9699E-03 | 2.9791E-02 |
| $a_8$ | 0.0000E+00 | -1.0384E-03 | 3.2857E-03 | -3.3619E-02 |
| $a_{10}$ | 0.0000E+00 | 0.0000E+00 | 0.0000E+00 | 1.5790E-02 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 631 | 632 | 641 | 642 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.3079E-01 | -1.2879E-01 |
| $a_6$ | 0.0000E+00 | 0.0000E+00 | 4.2934E-03 | 1.9067E-02 |
| $a_8$ | 0.0000E+00 | 0.0000E+00 | -4.4725E-03 | -4.5213E-03 |
| $a_{10}$ | 0.0000E+00 | 0.0000E+00 | 0.0000E+00 | 8.7817E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.29

| \multicolumn{7}{|c|}{EFL = 1.836 mm, HFOV= 73.028deg., TTL = 10.906mm, Image height = 2.176mm, Fno = 2.891} |
|---|---|---|---|---|---|---|
| Surface# | | Radius (mm) | Thickness (mm) | Refractive index | Abbe number | Focus (mm) | Material |
| - | Object | ∞ | 600.0000 | | | | |
| 711 | 1st lens element | 13.8707 | 0.2600 | 1.5445 | 55.9870 | -3.1600 | plastic |
| 712 | | 1.5018 | 1.6915 | | | | |
| 721 | 2nd lens element | -4.1878 | 1.8325 | 1.5445 | 55.9870 | 12.4640 | plastic |
| 722 | | -4.8280 | 0.4934 | | | | |
| 700 | aperture stop | ∞ | 0.3728 | | | | |
| 731 | 3rd lens element | 3.8569 | 1.4390 | 1.5168 | 64.1983 | 3.6110 | glass |
| 732 | | -3.0788 | 1.0798 | | | | |
| 741 | 4th lens element | 6.2932 | 0.3444 | 1.6606 | 20.4012 | 16.5430 | plastic |
| 742 | | 15.2533 | 2.7216 | | | | |
| 751 | cover glass | ∞ | 0.3000 | 1.5168 | 64.1673 | | glass |
| 752 | | | 0.3712 | | | | |
| 760 | image plane | ∞ | 0.0000 | | | | |

FIG.32

| | Aspherical parameters | | | |
|---|---|---|---|---|
| Surface# | 711 | 712 | 721 | 722 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 6.0511E-04 | 1.2698E-02 | 2.2626E-02 |
| $a_6$ | 0.0000E+00 | 5.8789E-03 | -5.5733E-03 | -1.6559E-02 |
| $a_8$ | 0.0000E+00 | -2.9024E-03 | 2.7693E-03 | 1.5262E-02 |
| $a_{10}$ | 0.0000E+00 | 0.0000E+00 | 0.0000E+00 | -4.7688E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 731 | 732 | 741 | 742 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -6.5107E-02 | -5.4495E-02 |
| $a_6$ | 0.0000E+00 | 0.0000E+00 | 2.2653E-02 | 2.2358E-02 |
| $a_8$ | 0.0000E+00 | 0.0000E+00 | -5.1283E-03 | -4.7329E-03 |
| $a_{10}$ | 0.0000E+00 | 0.0000E+00 | 0.0000E+00 | 2.4310E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.33

| | EFL = 2.1589 mm, HFOV= 73.011deg., TTL = 9.890mm, Image height = 2.44mm, Fno = 2.841 |
|---|---|---|---|---|---|---|
| Surface# | | Radius (mm) | Thickness (mm) | Refractive index | Abbe number | Focus (mm) | Material |
| - | Object | ∞ | 600.0000 | | | | |
| 811 | 1st lens element | 56.1648 | 0.2600 | 1.5445 | 55.9870 | -3.9730 | plastic |
| 812 | | 2.0519 | 1.9640 | | | | |
| 821 | 2nd lens element | -3.5183 | 1.9468 | 1.5445 | 55.9870 | 10.6710 | plastic |
| 822 | | -2.6012 | 0.1075 | | | | |
| 800 | aperture stop | ∞ | -0.0575 | | | | |
| 831 | 3rd lens element | 3.2771 | 1.5940 | 1.5168 | 64.1983 | 4.1400 | glass |
| 832 | | -4.9579 | 2.3066 | | | | |
| 841 | 4th lens element | 5.3702 | 0.3270 | 1.6606 | 20.4012 | -42.5560 | plastic |
| 842 | | 4.3772 | 0.7717 | | | | |
| 851 | cover glass | ∞ | 0.3000 | 1.5168 | 64.1673 | | glass |
| 852 | | | 0.3700 | | | | |
| 860 | image plane | ∞ | 0.0000 | | | | |

FIG.36

| Aspherical parameters | | | | |
|---|---|---|---|---|
| Surface# | 811 | 812 | 821 | 822 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 4.4065E-03 | -2.0162E-02 | 3.6928E-04 |
| $a_6$ | 0.0000E+00 | 3.0058E-04 | -3.9331E-03 | 3.2790E-03 |
| $a_8$ | 0.0000E+00 | -1.8695E-05 | 6.2818E-04 | -3.0815E-03 |
| $a_{10}$ | 0.0000E+00 | 0.0000E+00 | 0.0000E+00 | 1.4490E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 831 | 832 | 841 | 842 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.1560E-01 | -1.1669E-01 |
| $a_6$ | 0.0000E+00 | 0.0000E+00 | 2.8627E-03 | 1.4473E-02 |
| $a_8$ | 0.0000E+00 | 0.0000E+00 | -3.3503E-03 | -3.3645E-03 |
| $a_{10}$ | 0.0000E+00 | 0.0000E+00 | 0.0000E+00 | 5.6977E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.37

| EFL = 1.901 mm, HFOV= 73.013deg., TTL = 9.591mm, Image height = 2.127mm, Fno = 2.889 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 911 | 1st lens element | 46.7253 | 0.2601 | 1.5445 | 55.9870 | -3.4120 | plastic |
| 912 | | 1.7595 | 2.9059 | | | | |
| 921 | 2nd lens element | -26.3320 | 1.5227 | 1.5445 | 55.9870 | 7.2170 | plastic |
| 922 | | -3.4463 | 0.1035 | | | | |
| 900 | aperture stop | ∞ | -0.0535 | | | | |
| 931 | 3rd lens element | 2.8486 | 1.6144 | 1.5168 | 64.1983 | 3.1140 | glass |
| 932 | | -2.9011 | 0.9496 | | | | |
| 941 | 4th lens element | -6.0887 | 0.3692 | 1.6606 | 20.4012 | -5.6590 | plastic |
| 942 | | 9.0822 | 0.7565 | | | | |
| 951 | cover glass | ∞ | 0.3000 | 1.5168 | 64.1673 | 30.9958 | glass |
| 952 | | | 0.8630 | | | | |
| 960 | image plane | ∞ | 0.0000 | | | | |

FIG.40

| Aspherical parameters | | | | |
|---|---|---|---|---|
| Surface# | 911 | 912 | 921 | 922 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -3.8926E-03 | -3.0045E-02 | 3.4751E-03 |
| $a_6$ | 0.0000E+00 | 1.6329E-03 | 1.6769E-03 | -3.4128E-02 |
| $a_8$ | 0.0000E+00 | -4.0406E-04 | 5.8943E-04 | 5.1123E-02 |
| $a_{10}$ | 0.0000E+00 | 0.0000E+00 | 0.0000E+00 | -2.2893E-02 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 931 | 932 | 941 | 942 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.3500E-01 | -9.5313E-02 |
| $a_6$ | 0.0000E+00 | 0.0000E+00 | 1.6478E-02 | 2.2454E-02 |
| $a_8$ | 0.0000E+00 | 0.0000E+00 | -1.4152E-02 | -4.7362E-03 |
| $a_{10}$ | 0.0000E+00 | 0.0000E+00 | 0.0000E+00 | 5.0688E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.41

| EFL = 2.1832 mm, HFOV= 73.024deg., TTL = 8.5924mm, Image height = 2.393mm, Fno = 2.8304 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 1011 | 1st lens element | 43.0083 | 0.2600 | 1.5445 | 55.9870 | -3.7360 | plastic |
| 1012 | | 1.9126 | 1.5556 | | | | |
| 1021 | 2nd lens element | -3.1631 | 1.4181 | 1.5445 | 55.9870 | 8.2490 | plastic |
| 1022 | | -2.1342 | 0.1097 | | | | |
| 1000 | aperture stop | ∞ | -0.0514 | | | | |
| 1031 | 3rd lens element | 2.9322 | 1.9841 | 1.5168 | 64.1983 | 3.6150 | glass |
| 1032 | | -3.8290 | 1.5993 | | | | |
| 1041 | 4th lens element | 5.7630 | 0.2796 | 1.6606 | 20.4012 | -13.9750 | plastic |
| 1042 | | 3.4344 | 0.7674 | | | | |
| 1051 | cover glass | ∞ | 0.3000 | 1.5168 | 64.1673 | | glass |
| 1052 | | | 0.3700 | | | | |
| 1060 | image plane | ∞ | 0.0000 | | | | |

FIG.44

| Aspherical parameters | | | | |
|---|---|---|---|---|
| Surface# | 1011 | 1012 | 1021 | 1022 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 1.1813E-02 | -3.0087E-02 | -3.1810E-03 |
| $a_6$ | 0.0000E+00 | -1.0623E-03 | -7.6726E-03 | 7.5064E-03 |
| $a_8$ | 0.0000E+00 | 2.4452E-03 | 4.6718E-05 | -9.0158E-03 |
| $a_{10}$ | 0.0000E+00 | 0.0000E+00 | 0.0000E+00 | 4.7400E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 1031 | 1032 | 1041 | 1042 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.4757E-01 | -1.4064E-01 |
| $a_6$ | 0.0000E+00 | 0.0000E+00 | 6.9347E-03 | 2.2109E-02 |
| $a_8$ | 0.0000E+00 | 0.0000E+00 | -5.3716E-03 | -5.0166E-03 |
| $a_{10}$ | 0.0000E+00 | 0.0000E+00 | 0.0000E+00 | 8.6880E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.45

| EFL = 2.2765 mm, HFOV= 73.03deg., TTL = 10.7552mm, Image height = 2.628mm, Fno = 2.8472 ||||||||
|---|---|---|---|---|---|---|---|
| Surface# | | Radius (mm) | Thickness (mm) | Refractive index | Abbe number | Focus (mm) | Material |
| - | Object | ∞ | 600.0000 | | | | |
| 1111 | 1st lens element | 28.6965 | 0.2600 | 1.5445 | 55.9870 | -4.0970 | plastic |
| 1112 | | 2.0370 | 2.2512 | | | | |
| 1121 | 2nd lens element | -3.0511 | 1.7439 | 1.5445 | 55.9870 | 13.6550 | plastic |
| 1122 | | -2.5847 | 0.1032 | | | | |
| 1100 | aperture stop | ∞ | -0.0533 | | | | |
| 1131 | 3rd lens element | 3.9509 | 1.7688 | 1.5168 | 64.1983 | 4.4730 | glass |
| 1132 | | -4.5788 | 2.6513 | | | | |
| 1141 | 4th lens element | 3.9834 | 0.3729 | 1.6606 | 20.4012 | 71.0360 | plastic |
| 1142 | | 4.2080 | 1.0390 | | | | |
| 1151 | cover glass | ∞ | 0.3000 | 1.5168 | 64.1673 | | glass |
| 1152 | | | 0.3182 | | | | |
| 1160 | image plane | ∞ | 0.0000 | | | | |

FIG.48

| Aspherical parameters | | | | |
|---|---|---|---|---|
| Surface# | 1111 | 1112 | 1121 | 1122 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 7.8520E-03 | -1.4527E-02 | 8.8733E-04 |
| $a_6$ | 0.0000E+00 | -1.9421E-03 | -3.6809E-03 | 1.7256E-03 |
| $a_8$ | 0.0000E+00 | 3.9955E-04 | 7.3295E-04 | -4.4324E-04 |
| $a_{10}$ | 0.0000E+00 | 0.0000E+00 | 0.0000E+00 | -8.5846E-06 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 1131 | 1132 | 1141 | 1142 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -9.0277E-02 | -1.0279E-01 |
| $a_6$ | 0.0000E+00 | 0.0000E+00 | 1.9625E-02 | 3.0397E-02 |
| $a_8$ | 0.0000E+00 | 0.0000E+00 | -5.2917E-03 | -7.8192E-03 |
| $a_{10}$ | 0.0000E+00 | 0.0000E+00 | 0.0000E+00 | 6.8105E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.49

| EFL = 1.8829 mm,HFOV= 73.029deg., TTL = 9.630mm,Image height = 2.125mm,Fno = 2.7088 |||||||
|---|---|---|---|---|---|---|
| Surface# | | Radius (mm) | Thickness (mm) | Refractive index | Abbe number | Focus (mm) | Material |
| - | Object | ∞ | 600.0000 | | | | |
| 1211 | 1st lens element | 70.0000 | 0.5844 | 1.5445 | 55.9870 | -4.5260 | plastic |
| 1212 | | 2.3418 | 3.0363 | | | | |
| 1200 | aperture stop | ∞ | | | | | |
| 1221 | 2nd lens element | -9.5823 | 1.2939 | 1.5445 | 55.9870 | 5.2820 | plastic |
| 1222 | | -2.2915 | 0.1865 | | | | |
| 1231 | 3rd lens element | 5.0947 | 1.6876 | 1.5168 | 64.1983 | 3.5610 | glass |
| 1232 | | -2.5057 | 1.2726 | | | | |
| 1241 | 4th lens element | 13.2622 | 0.4644 | 1.6606 | 20.4012 | -4.4660 | plastic |
| 1242 | | 2.3135 | 0.4343 | | | | |
| 1251 | cover glass | ∞ | 0.3000 | 1.5168 | 64.1673 | | glass |
| 1252 | | | 0.3699 | | | | |
| 1260 | image plane | ∞ | 0.0000 | | | | |

FIG.52

| Aspherical parameters | | | | |
|---|---|---|---|---|
| Surface# | 1211 | 1212 | 1221 | 1222 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | -6.5389E-05 | -5.7000E-02 | -6.7872E-03 |
| $a_6$ | 0.0000E+00 | -2.3663E-04 | 1.3000E-02 | 4.9150E-03 |
| $a_8$ | 0.0000E+00 | 9.6144E-05 | -3.4000E-02 | -8.6026E-03 |
| $a_{10}$ | 0.0000E+00 | 0.0000E+00 | 0.0000E+00 | 6.2078E-03 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface# | 1231 | 1232 | 1241 | 1242 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | 0.0000E+00 | 0.0000E+00 | -1.4304E-01 | -1.2844E-01 |
| $a_6$ | 0.0000E+00 | 0.0000E+00 | 1.0610E-02 | 2.6922E-02 |
| $a_8$ | 0.0000E+00 | 0.0000E+00 | -1.1335E-03 | -4.8510E-03 |
| $a_{10}$ | 0.0000E+00 | 0.0000E+00 | 0.0000E+00 | 3.6229E-04 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.53

| Embodiment | 1st | 2nd | 3rd | 4th | 5th | 6th |
|---|---|---|---|---|---|---|
| T1 | 0.600 | 0.600 | 0.212 | 0.600 | 0.355 | 0.408 |
| G12 | 2.900 | 2.637 | 1.055 | 3.592 | 1.692 | 1.803 |
| T2 | 1.819 | 1.295 | 0.734 | 2.489 | 1.898 | 1.102 |
| G23 | 0.405 | 0.405 | 0.016 | 0.405 | 0.366 | 0.050 |
| T3 | 1.679 | 1.636 | 1.005 | 2.148 | 1.525 | 1.419 |
| G34 | 0.998 | 1.524 | 1.159 | 1.310 | 1.516 | 2.114 |
| T4 | 0.450 | 0.450 | 0.657 | 0.450 | 0.429 | 0.378 |
| G4C | 0.552 | 0.291 | 0.508 | 0.285 | 0.281 | 0.934 |
| TC | 0.300 | 0.300 | 0.300 | 0.300 | 0.300 | 0.300 |
| GCP | 0.371 | 0.370 | 0.375 | 0.370 | 0.370 | 0.370 |
| AAG | 4.304 | 4.566 | 2.230 | 5.307 | 3.574 | 3.967 |
| ALT | 4.549 | 3.982 | 2.607 | 5.687 | 4.206 | 3.306 |
| BFL | 1.223 | 0.961 | 1.182 | 0.955 | 0.951 | 1.604 |
| TTL | 10.076 | 9.509 | 6.020 | 11.949 | 8.731 | 8.877 |
| EFL | 1.905 | 1.856 | 2.454 | 1.870 | 1.854 | 2.217 |
| TL | 8.852 | 8.548 | 4.837 | 10.994 | 7.781 | 7.273 |
| ALT/AAG | 1.057 | 0.872 | 1.169 | 1.072 | 1.177 | 0.833 |
| G34/BFL | 0.816 | 1.587 | 0.981 | 1.372 | 1.595 | 1.318 |
| TTL/EFL | 5.289 | 5.123 | 2.453 | 6.391 | 4.708 | 4.005 |
| G12/T2 | 1.594 | 2.036 | 1.438 | 1.443 | 0.891 | 1.636 |
| ALT/G34 | 4.557 | 2.612 | 2.249 | 4.341 | 2.774 | 1.564 |
| TL/G34 | 8.868 | 5.607 | 4.172 | 8.392 | 5.131 | 3.441 |
| T2/G34 | 1.823 | 0.850 | 0.633 | 1.900 | 1.251 | 0.521 |
| EFL/BFL | 1.557 | 1.931 | 2.076 | 1.958 | 1.951 | 1.382 |
| G12/T3 | 1.727 | 1.612 | 1.050 | 1.672 | 1.109 | 1.271 |
| G12/G34 | 2.906 | 1.730 | 0.910 | 2.742 | 1.115 | 0.853 |
| AAG/G34 | 4.311 | 2.995 | 1.923 | 4.051 | 2.357 | 1.877 |
| TL/G12 | 3.052 | 3.242 | 4.585 | 3.061 | 4.600 | 4.033 |
| AAG/G12 | 1.484 | 1.732 | 2.114 | 1.477 | 2.113 | 2.200 |
| AAG/T3 | 2.563 | 2.791 | 2.219 | 2.470 | 2.344 | 2.796 |
| AAG/T2 | 2.365 | 3.525 | 3.039 | 2.133 | 1.883 | 3.600 |
| TL/T3 | 5.272 | 5.224 | 4.813 | 5.117 | 5.103 | 5.126 |
| TTL/G34 | 10.094 | 6.237 | 5.192 | 9.121 | 5.758 | 4.199 |
| T3/T2 | 0.923 | 1.263 | 1.370 | 0.863 | 0.804 | 1.287 |
| T3/G34 | 1.682 | 1.073 | 0.867 | 1.640 | 1.006 | 0.671 |
| TL/T2 | 4.865 | 6.599 | 6.593 | 4.418 | 4.100 | 6.600 |

FIG. 54A

| Embodiment | 7th | 8th | 9th | 10th | 11th | 12th |
|---|---|---|---|---|---|---|
| T1 | 0.260 | 0.260 | 0.260 | 0.260 | 0.260 | 0.584 |
| G12 | 1.692 | 1.964 | 2.906 | 1.556 | 2.251 | 3.036 |
| T2 | 1.833 | 1.947 | 1.523 | 1.418 | 1.744 | 1.294 |
| G23 | 0.866 | 0.050 | 0.050 | 0.058 | 0.050 | 0.187 |
| T3 | 1.439 | 1.594 | 1.614 | 1.984 | 1.769 | 1.688 |
| G34 | 1.080 | 2.307 | 0.950 | 1.599 | 2.651 | 1.273 |
| T4 | 0.344 | 0.327 | 0.369 | 0.280 | 0.373 | 0.464 |
| G4C | 2.722 | 0.772 | 0.756 | 0.767 | 1.039 | 0.434 |
| TC | 0.300 | 0.300 | 0.300 | 0.300 | 0.300 | 0.300 |
| GCP | 0.371 | 0.370 | 0.863 | 0.370 | 0.318 | 0.370 |
| AAG | 3.638 | 4.321 | 3.905 | 3.213 | 4.953 | 4.495 |
| ALT | 3.876 | 4.128 | 3.766 | 3.942 | 4.146 | 4.030 |
| BFL | 3.393 | 1.442 | 1.919 | 1.437 | 1.657 | 1.104 |
| TTL | 10.906 | 9.890 | 9.591 | 8.592 | 10.755 | 9.630 |
| EFL | 1.836 | 2.159 | 1.901 | 2.183 | 2.277 | 1.883 |
| TL | 7.513 | 8.448 | 7.672 | 7.155 | 9.098 | 8.526 |
| ALT/AAG | 1.065 | 0.955 | 0.964 | 1.227 | 0.837 | 0.897 |
| G34/BFL | 0.318 | 1.600 | 0.495 | 1.113 | 1.600 | 1.153 |
| TTL/EFL | 5.939 | 4.581 | 5.045 | 3.936 | 4.724 | 5.114 |
| G12/T2 | 0.923 | 1.009 | 1.908 | 1.097 | 1.291 | 2.347 |
| ALT/G34 | 3.589 | 1.790 | 3.966 | 2.465 | 1.564 | 3.167 |
| TL/G34 | 6.958 | 3.663 | 8.079 | 4.474 | 3.432 | 6.699 |
| T2/G34 | 1.697 | 0.844 | 1.603 | 0.887 | 0.658 | 1.017 |
| EFL/BFL | 0.541 | 1.497 | 0.990 | 1.519 | 1.374 | 1.705 |
| G12/T3 | 1.176 | 1.232 | 1.800 | 0.784 | 1.273 | 1.799 |
| G12/G34 | 1.566 | 0.851 | 3.060 | 0.973 | 0.849 | 2.386 |
| AAG/G34 | 3.369 | 1.873 | 4.113 | 2.009 | 1.868 | 3.532 |
| TL/G12 | 4.442 | 4.302 | 2.640 | 4.600 | 4.041 | 2.808 |
| AAG/G12 | 2.150 | 2.200 | 1.344 | 2.066 | 2.200 | 1.481 |
| AAG/T3 | 2.528 | 2.710 | 2.419 | 1.619 | 2.800 | 2.664 |
| AAG/T2 | 1.985 | 2.219 | 2.565 | 2.266 | 2.840 | 3.474 |
| TL/T3 | 5.221 | 5.300 | 4.752 | 3.606 | 5.144 | 5.052 |
| TTL/G34 | 10.100 | 4.288 | 10.100 | 5.372 | 4.057 | 7.567 |
| T3/T2 | 0.785 | 0.819 | 1.060 | 1.399 | 1.014 | 1.304 |
| T3/G34 | 1.333 | 0.691 | 1.700 | 1.241 | 0.667 | 1.326 |
| TL/T2 | 4.100 | 4.340 | 5.038 | 5.046 | 5.217 | 6.589 |

FIG. 54B

OPTICAL IMAGING LENS

CROSS-REFERENCE TO RELATED APPLICATIONS

This application claims priority to P.R.C. Patent Application No. 201610523506.X filed on Jul. 5, 2016, which is hereby incorporated by reference in its entirety.

TECHNICAL FIELD

The present disclosure relates to an optical imaging lens, and particularly relates to an optical imaging lens having four lens elements.

BACKGROUND

The specifications of electrical products for consumers change with each passing day, and trend for reducing sizes of mobile phones has not slowed down. Therefore, the specifications of critical elements of optical lens also must been upgraded continuously to conform to consumers' demands. Except for imaging quality and size of an optical lens, the most important characteristic of an optical lens further comprise the field angle of view enhancement. The applications of the optical lens are not only limited in taking picture and recording videos, and the optical lens can be applied in a monitor or a driving recorder.

However, manufacturing an optical lens with perfect imaging quality and smaller size cannot be achieved only by reducing the length of the optical lens. The process for manufacturing an optical lens must consider the optical lens's material and assembly yield. In conclusion, designing a small sized optical lens is more difficult than designing a traditional optical lens. Therefore, manufacturing an optical lens conformed to consumers' demands and upgrading its imaging quality are always in high demand with regard to industries, governments, and academia for a long time.

SUMMARY

The present disclosure provides an optical imaging lens. With controlling the convex or concave shape of the surfaces, the length of the optical imaging lens may be shortened while maintaining desirable optical characteristics.

The optical imaging lens may be primarily used for taking pictures and recording videos. Moreover, the optical imaging lens may be applied to a mobile electrical device, such as a mobile phone, a camera, a pad, a personal digital assistant (PDA), a car photographic device, or a virtual reality (VR) tracker.

In one embodiment, an optical imaging lens may comprise, sequentially from an object side to an image side along an optical axis, a first, second, third, and fourth lens elements. Each of the first, second, third, and fourth lens elements may have a refracting power, an object-side surface facing toward the object side and an image-side surface facing toward the image side and a central thickness defined along an optical axis, wherein: the image-side surface of the first lens element may comprise a concave portion in a vicinity of the optical axis; the second lens element has a positive refracting power; the object-side surface of the third lens element may comprise a convex portion in a vicinity of a periphery of the third lens element, the image-side surface of said third lens element may comprise a convex portion in a vicinity of a periphery of the third lens element; the image-side surface of the fourth lens element may comprise a concave portion in a vicinity of the optical axis; a sum of a central thicknesses of all four lens elements along the optical axis is represented by ALT, an air gap between the first lens element and the second lens element along the optical axis is represented by G12, an air gap between the second lens element and the third lens element along the optical axis is represented by G23, an air gap between the third lens element and the fourth lens element along the optical axis is represented by G34, a sum of G12, G23, and G34 is represented by AAG, ALT and AAG satisfy the equation: $ALT/AAG \leq 1.25$; and wherein the optical imaging lens may comprise no other lenses having refracting power beyond the first, second, third, and fourth lens elements.

In the specification, parameters used here are: a central thickness of the first lens element is represented by T1, an air gap between the first lens element and the second lens element along the optical axis is represented by G12, a central thickness of the second lens element is represented by T2, an air gap between the second lens element and the third lens element along the optical axis is represented by G23, a central thickness of the third lens element is represented by T3, an air gap between the third lens element and the fourth lens element along the optical axis is represented by G34, a central thickness of the fourth lens element is represented by T4, a distance between the image-side surface of the fourth lens element and the object-side surface of a cover glass along the optical axis is represented by G4C, a central thickness of a cover glass along the optical axis is represented by TC, a distance between the image-side surface of the cover glass and an image plane along the optical axis is represented by GCP, a focusing length of the first lens element is represented by f1, a focusing length of the second lens element is represented by f2, a focusing length of the third lens element is represented by f3, a focusing length of the fourth lens element is represented by f4, a refracting index of the first lens element is represented by n1, a refracting index of the second lens element is represented by n2, a refracting index of the third lens element is represented by n3, a refracting index of the fourth lens element is represented by n4, an abbe number of the first lens element is represented by v1, an abbe number of the second lens element is represented by v2, an abbe number of the third lens element is represented by v3, an abbe number of the fourth lens element is represented by v4, an effective focal length of the optical imaging lens is represented by EFL, a distance between the object-side surface of the first lens element and an image plane along the optical axis is represented by TTL, a distance between the object-side surface of the first lens element and the image-side surface of the fourth lens element along the optical axis is represented by TL, a sum of T1, T2, T3, and T4 is represented by ALT, a sum of G12, G23 and G34 is represented by AAG, a back focal length of the optical imaging lens which is defined as a distance from the image-side surface of the fourth lens element to the image plane along the optical axis is a sum of G4C, TC and GCP and represented by BFL.

BRIEF DESCRIPTION OF THE DRAWINGS

Embodiments of the present disclosure will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of a seventh embodiment of an optical imaging lens according to the present disclosure;

FIG. 33 is a table of aspherical data of a seventh embodiment of the optical imaging lens according to the present disclosure;

FIG. 36 is a table of optical data for each lens element of the optical imaging lens of a eighth embodiment of the present disclosure;

FIG. 37 is a table of aspherical data of a eighth embodiment of the optical imaging lens according to the present disclosure;

FIG. 40 is a table of optical data for each lens element of the optical imaging lens of a ninth embodiment of the present disclosure;

FIG. 41 is a table of aspherical data of a ninth embodiment of the optical imaging lens according to the present disclosure;

FIG. 44 is a table of optical data for each lens element of the optical imaging lens of a tenth embodiment of the present disclosure;

FIG. 45 is a table of aspherical data of a tenth embodiment of the optical imaging lens according to the present disclosure;

FIG. 48 is a table of optical data for each lens element of the optical imaging lens of a eleventh embodiment of the present disclosure;

FIG. 49 is a table of aspherical data of a eleventh embodiment of the optical imaging lens according to the present disclosure;

FIG. 52 is a table of optical data for each lens element of the optical imaging lens of a twelfth embodiment of the present disclosure;

FIG. 53 is a table of aspherical data of a twelfth embodiment of the optical imaging lens according to the present disclosure;

FIG. 54A is a table for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the first example embodiment through the sixth example embodiment;

FIG. 54B is a table for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the seventh example embodiment through the twelfth example embodiment.

DETAILED DESCRIPTION

Figures 3, 4, 5:
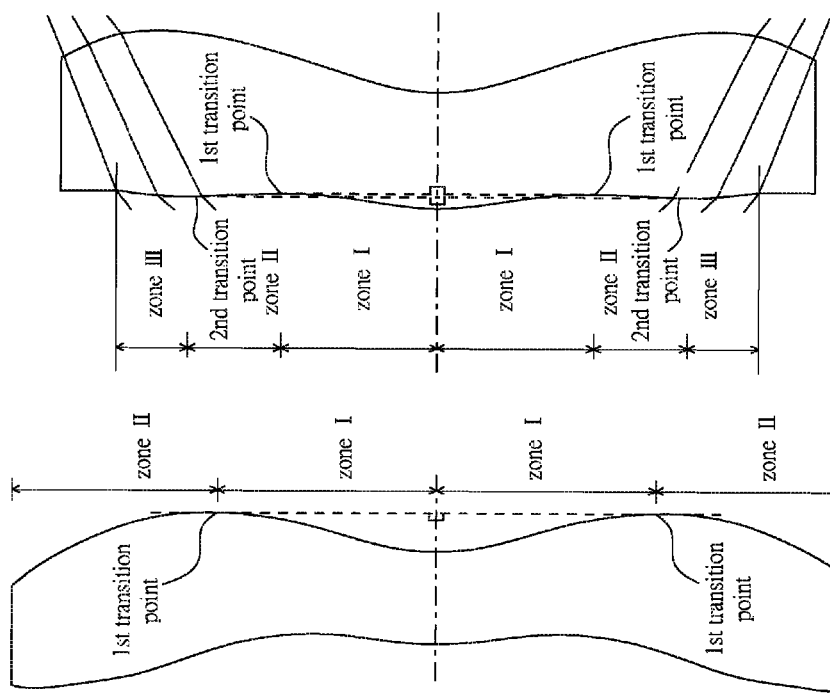
FIG. 3 is a schematic view of a first example of the surface shape and the efficient radius of the lens element.
FIG. 4 is a schematic view of a second example of the surface shape and the efficient radius of the lens element.
FIG. 5 is a schematic view of a third example of the surface shape and the efficient radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element." Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present disclosure. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 depicts a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there may be other portions existing between the portion in a vicinity of the optical axis and the portion in a vicinity of a periphery of the lens element; the numbers of portions may depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion may be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion may be determined as having a convex shape. In contrast, if the ray diverges after passing through a portion, the extension line of the ray intersects the optical axis at the object side of the lens element, i.e. the focal point of the ray is at the object side (see point M in FIG. 2), that portion may be determined as having a concave shape. Therefore, referring to FIG. 2, the portion between the central point and the first transition point may have a convex shape; the portion located radially outside of the first transition point may have a concave shape. Further, the first transition point is the point where the portion having a convex shape changes to the portion having a concave shape, namely the border of two adjacent portions. Alternatively, there may be another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, may appear within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point may exist on the object-side surface (within the clear aperture) of a lens element. Here, portion I may be the portion in a vicinity of the optical axis, and portion III may be the portion in a vicinity of a periphery of the lens element. The portion in a vicinity of the optical axis may have a convex shape because the R value at the object-side surface of the lens element is positive. The portion in a vicinity of a periphery of the lens element (portion III) has a convex shape. Further, there may be another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

The optical imaging lens of the present disclosure may be a prime lens. The optical imaging lens may comprise a first lens element, a second lens element, a third lens element, and a fourth lens element, and these lens elements may be arranged sequentially from the object side to the image side along an optical axis. Each of the lens elements may comprise a refracting power, an object-side surface facing toward an object side, and an image-side surface facing toward an image side. The optical imaging lens may further comprise an aperture stop, and the aperture stop may be in front of the third lens element.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
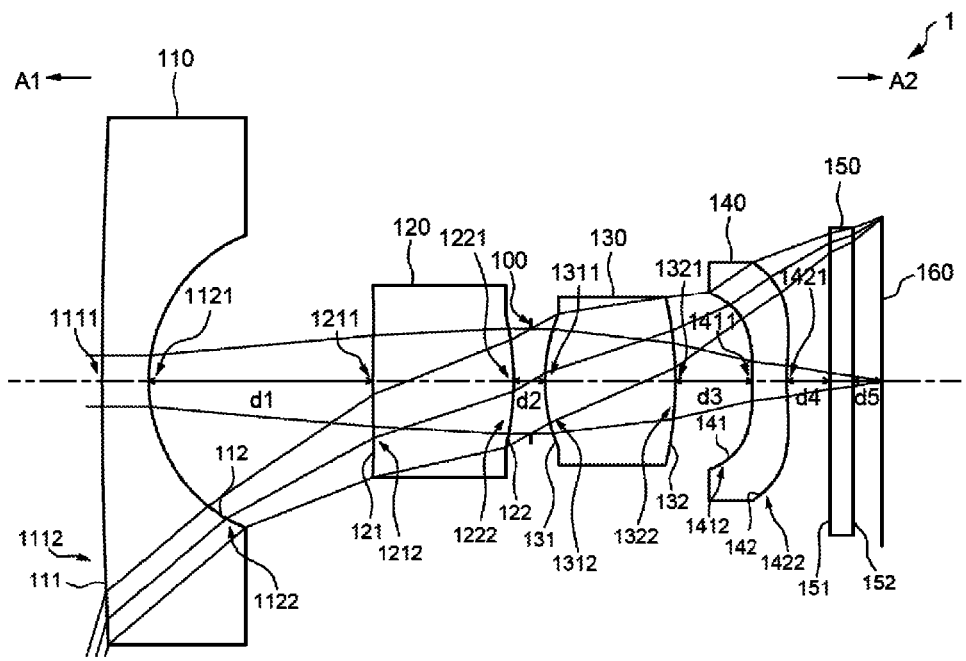
FIG. 6 is a cross-sectional view of a first embodiment of an optical imaging lens having four lens elements according to the present disclosure.
Figure 7:
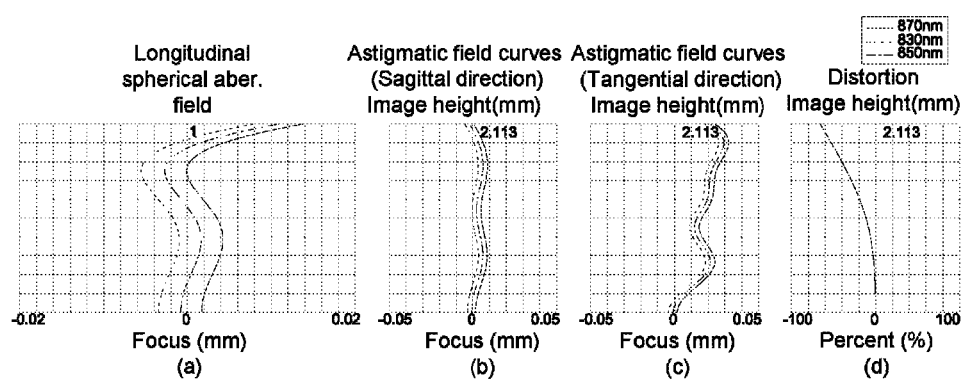
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 6-9. FIG. 6 illustrates an example cross-sectional view of an optical imaging lens 1 having four lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, an aperture stop 100, a third lens element 130, and a fourth lens element 140. A cover glass 150 and an image plane 160 of an image sensor may be positioned at the image side A2 of the optical lens 1. Each of the first, second, third, fourth lens elements 110, 120, 130, 140 and the cover glass 150 may comprise an object-side surface 111/121/131/141/151 facing toward the object side A1 and an image-side surface 112/122/132/142/152 facing toward the image side A2. The cover glass 150 is positioned between the fourth lens element 140 and an image plane 160.

Please noted that during the normal operation of the optical imaging lens 1, the distance between any two adjacent lens elements of the first, second, third, and fourth lens elements 110, 120, 130, 140 may be an unchanged value, i.e. the optical imaging lens 1 is a prime lens.

Embodiments of each lens element of the optical imaging lens 1 which may be constructed by plastic material will now be described with reference to the drawings.

An example embodiment of the first lens element 110 may have a negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110. The image-side surface 112 may be an aspherical surface.

An example embodiment of the second lens element 120 may have a positive refracting power. The object-side surface 121 may comprise a convex portion 1211 in a vicinity of the optical axis and a concave portion 1212 in a vicinity of a periphery of the second lens element 120. The image-side surface 122 may be a convex surface comprising a convex portion 1221 in a vicinity of the optical axis and a convex portion 1222 in a vicinity of the periphery of the second lens element 120.

An example embodiment of the third lens element 130 may have a positive refracting power. The object-side surface 131 may be a convex surface comprising a convex portion 1311 in a vicinity of the optical axis and convex portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140 may have a negative refracting power. The object-side surface 141 may be a concave surface comprising a concave portion 1411 in a vicinity of the optical axis and a concave portion 1412 in a vicinity of a periphery of the fourth lens element 140. The image-side surface 142 may comprise a concave portion 1421 in a vicinity of the optical axis and a convex portion 1422 in a vicinity of the periphery of the fourth lens element 140. The object-side surface 141 and the image-side surface 142 may be aspherical surfaces.

In some embodiments, air gaps may exist between the lens elements 110, 120, 130, 140, the cover glass 150 and the image plane 160 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the cover glass 150, the air gap d5 existing between the cover glass 150 and the image plane 160 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, and the sum of d1, d2, and d3 is denoted by AAG.

FIG. 8 depicts the optical characteristics of each lens elements in the optical imaging lens 1 of the present embodiment, and please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 111 of the first lens element 110 to the image plane 160 along the optical axis may be about 9.591 mm, the image height may be about 2.127 mm.

The aspherical surfaces including the image-side surface 112 of the first lens element 110, the object-side surface 121 and the image-side surface 122 of the second lens element 120, the object-side surface 141 and the image-side surface 142 of the fourth lens element 140 may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 9.

FIG. 7 part (a) shows the longitudinal spherical aberration, wherein the transverse axis of FIG. 7 part (a) defines the focus, and the lengthwise axis of FIG. 7 part (a) defines the filed. From the vertical deviation of each curve shown in FIG. 7 part (a), the offset of the off-axis light relative to the image point may be within about ±0.012 mm. Therefore, the optical imaging lens 1 indeed eliminates aberration effectively. Additionally, the three curves presenting different wavelengths are closed to each other, and this situation represents that off-axis light with respect to these wavelengths is focused around an image point, and the aberration can be improved obviously.

FIG. 7 part (b) and 7 part (c) respectively show the astigmatism aberrations in the sagittal and tangential directions, wherein the transverse axis of FIG. 7 part (b) defines the focus, the lengthwise axis of FIG. 7 part (b) defines the image height, the transverse axis of FIG. 7 part (c) defines the focus, the lengthwise axis of FIG. 7 part (c) defines the image height. Referring to FIG. 7 part (b), the focus variation with respect to the three different wavelengths (830 nm, 850 nm, 870 nm) in the whole field falls within about ±0.01 mm. Referring to FIG. 7 part (c), the focus variation with respect to the three different wavelengths (830 nm, 850 nm, 870 nm) in the whole field falls within about ±0.03 mm. Therefore, the optical imaging lens 1 of the present embodiment can eliminate aberration effectively. Additionally, the three curves presenting different wavelengths may be closed to each other, and this situation may represent that the dispersion can be improved obviously. Please refer to FIG. 7 part (d), the transverse axis of FIG. 7 part (d) defines the percentage, the lengthwise axis of FIG. 7 part (d) defines the image height, and the variation of the distortion aberration may be within about ±70%. The variation of the distortion aberration of the present embodiment has conformed to the demand of imaging quality. Additionally, the optical imaging lens of this embodiment compares with the current optical imaging lens, the total length of the optical imaging lens may be shortened to about 9.591 mm, the optical imaging lens 1 of the present embodiment can eliminate aberration effectively and provide better imaging quality. The optical imaging lens 1 of the example embodiment indeed achieves great optical performance and the length of the optical imaging lens 1 is effectively shortened.

Figure 10:
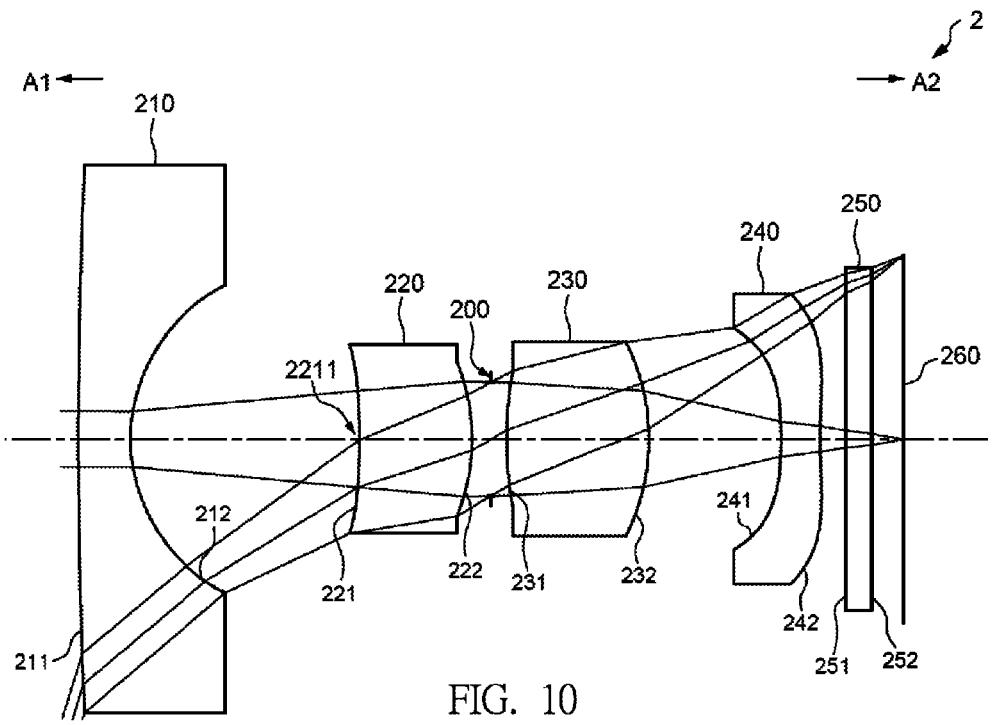
FIG. 10 is a cross-sectional view of a second embodiment of an optical imaging lens having four lens elements according to the present disclosure.
Figure 11:
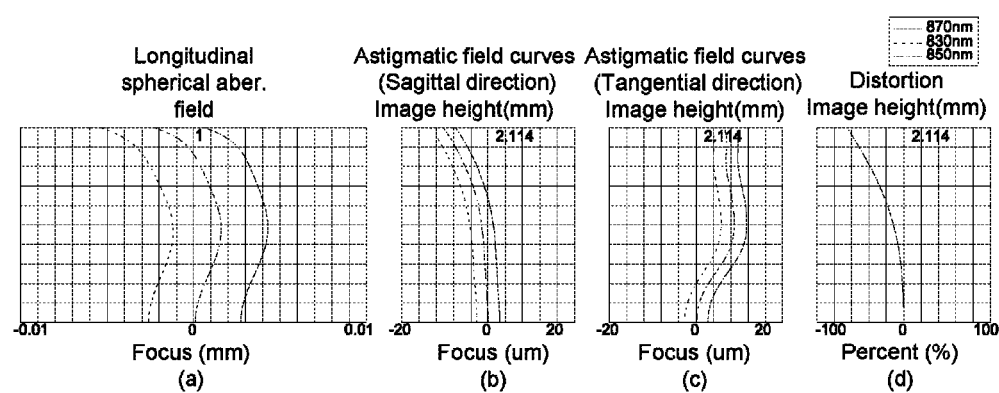
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having four lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment may comprise, in an order from an object side A1 to an image side A2 along an optical axis, a first lens element 210, a second lens element 220, an aperture stop 200, a third lens element 230, and a fourth lens element 240.

The configurations of the concave/convex shapes of surfaces comprising the object-side surfaces 211, 231, 241 facing to the object side A1 and the image-side surfaces 212, 222, 232, 242 facing to the image side A2 are similar to those in the first embodiment. The differences between the second embodiment and the first embodiment comprise the radius of curvature, thickness of each lens element, aspherical parameters of each lens element, the back focal length, and the shape of the object-side surface 221. For clearly showing the drawings of the present embodiment, only the surface shapes which are different from those in the first embodiment are labeled. Specifically, the object-side surface 221 of the second lens element 220 may comprise a concave portion 2211 in a vicinity of the optical axis. Please refer to FIG. 12 for the optical characteristics of each lens elements in the optical imaging lens 2 of the present embodiment, and please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 211 of the first lens element 210 to the image plane 260 along the optical axis (TTL) may be about 9.509 mm and the image height of the optical imaging lens 2 may be about 2.114 mm.

FIG. 11 part (a) shows the longitudinal spherical aberration. From the vertical deviation of each curve shown in FIG. 11 part (a), the offset of the off-axis light relative to the image point may be within about ±0.004 mm. Furthermore, the three curves having different wavelengths may be closed to each other, and this situation may represent that off-axis light with respect to these wavelengths is focused around an image point, and the aberration can be improved obviously. FIG. 11 part (b) and 11 part (c) respectively show the astigmatism aberration in the sagittal direction and astigmatism aberration in the tangential direction, Referring to FIG. 11 part (b), the focus variation with respect to the three different wavelengths (830 nm, 850 nm, 870 nm) in the whole field falls within about ±15 um. Referring to FIG. 11 part (c), the focus variation with respect to the three different wavelengths (830 nm, 850 nm, 870 nm) in the whole field falls within about ±12 um. Additionally, the three curves presenting different wavelengths are closed to each other, and these closed curves represents that the dispersion is improved. Please refer to FIG. 11 part (d), the variation of the distortion aberration of the optical imaging lens 2 may be within about ±70%.

Comparing with the first embodiment, TTL of the second embodiment may be shorter, the half angle of field of view (HFOV) of the second embodiment may be bigger, and the aberrations of the second embodiment may be smaller so the image quality may be better. Moreover, the yield of the second embodiment may be higher because the manufacturing process of the second embodiment may be easier.

Figure 14:
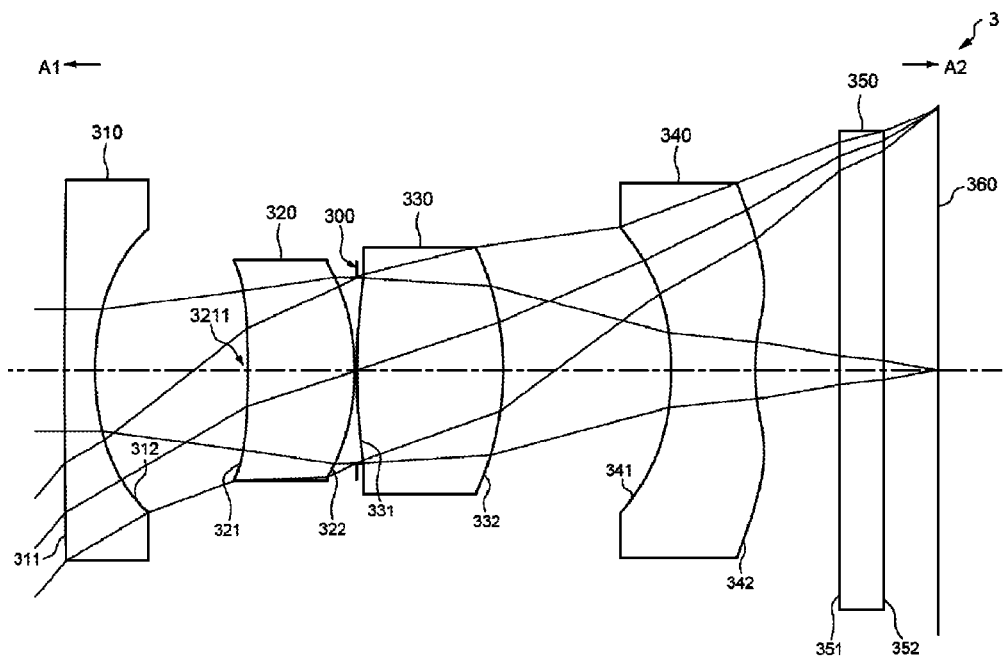
FIG. 14 is a cross-sectional view of a third embodiment of an optical imaging lens having four lens elements according to the present disclosure.
Figure 15:
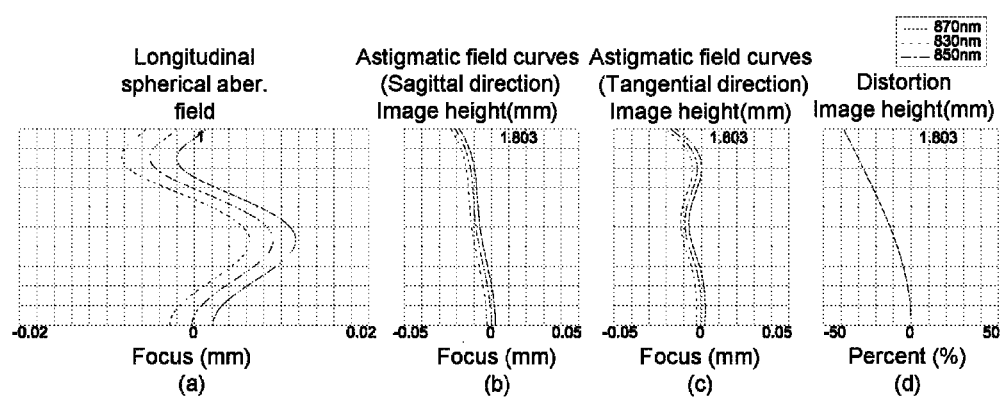
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3, which may comprise four lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment may comprise, in an order from an object side A1 to an image side A2 along an optical axis, a first lens element 310, a second lens element 320, an aperture stop 300, a third lens element 330, and a fourth lens element 340.

The configurations of the concave/convex shapes of surfaces comprising the object-side surfaces 311, 331, 341 facing to the object side A1 and the image-side surfaces 312, 322, 332, 342 facing to the image side A2, are similar to those in the first embodiment. The differences between the third embodiment and the first embodiment comprise the radius of curvature, the thickness of each lens element, the aspherical parameters of each lens element, the back focal length, and the object-side surface 321. For clearly showing the drawings of the present embodiment, only the surface shapes which are different from those in the first embodiment are labeled. Specifically, the object-side surface 321 of the second lens element 320 may comprise a concave portion 3121 in a vicinity of the optical axis. FIG. 16 depicts the optical characteristics of each lens elements in the optical imaging lens 3 of the present embodiment, and please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 311 of the first lens element 310 to the image plane 360 along the optical axis may be about 6.020 mm and the image height of the optical imaging lens 3 may be about 1.803 mm.

FIG. 15 part (a) shows the longitudinal spherical aberration. From the vertical deviation of each curve shown in FIG. 15 part (a), the offset of the off-axis light relative to the image point may be within about ±0.012 mm. Furthermore, the three curves having different wavelengths may be closed to each other, and this situation may represent that off-axis light with respect to these wavelengths is focused around an image point, and the aberration can be improved obviously. FIG. 15 part (b) and 15 part (c) respectively show the astigmatism aberration in the sagittal direction and astigmatism aberration in the tangential direction. Referring to FIG. 15 part (b), the focus variation with respect to the three different wavelengths (830 nm, 850 nm, 870 nm) in the whole field falls within about ±0.025 mm. Referring to FIG. 15 part (c), the focus variation with respect to the three different wavelengths (830 nm, 850 nm, 870 nm) in the whole field falls within about ±0.02 mm. Additionally, the three curves presenting different wavelengths are closed to each other, and these closed curves represents that the dispersion is improved. Please refer to FIG. 15 part (d), the variation of the distortion aberration of the optical imaging lens 3 may be within about ±40%.

Comparing with the first embodiment, TTL of the third embodiment may be shorter, the aberrations of the third embodiment may be smaller so the image quality may be better, and the aperture stop 300 may be smaller. Moreover, the yield of the third embodiment may be higher because the manufacturing process of the third embodiment may be easier.

Figure 18:
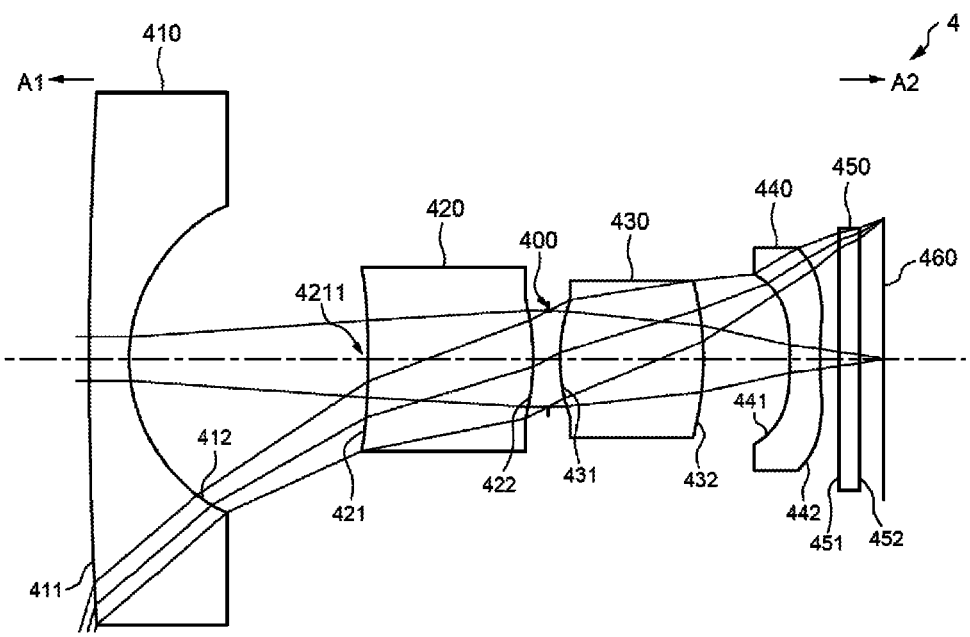
FIG. 18 is a cross-sectional view of a fourth embodiment of an optical imaging lens having four lens elements according to the present disclosure.
Figure 19:
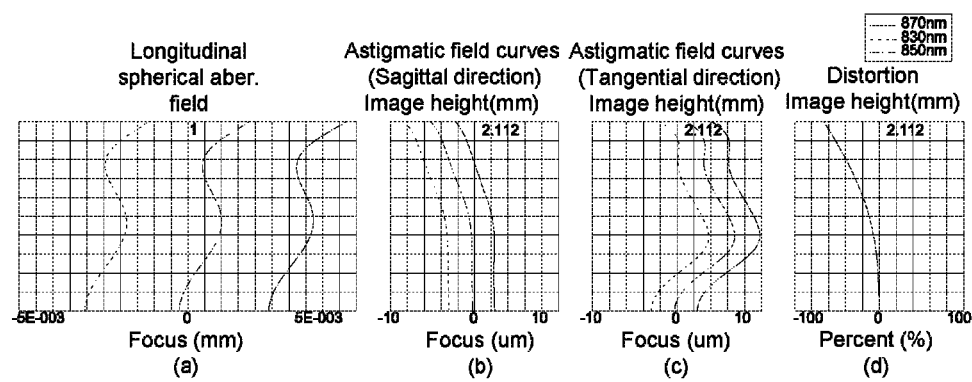
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having four lens elements of the optical imaging lens 4 according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, an aperture stop 400, a third lens element 430, and a fourth lens element 440.

The configurations of the concave/convex shapes of surfaces, comprising the object-side surfaces 411, 431, 441 facing to the object side A1 and the image-side surfaces 412, 422, 432, 442 facing to the image side A2, are similar to those in the first embodiment. The differences between the fourth embodiment and the first embodiment comprise the radius of curvature, the thickness of each lens element, the aspherical parameters of each lens element, the back focal length, and the shape of the object-side surface 421. For clearly showing the drawings of the present embodiment, only the surface shapes which are different from those in the first embodiment are labeled. Specifically, the object-side surface 421 of the second lens element 420 may comprise a concave portion 4221 in a vicinity of the optical axis. FIG. 20 depicts the optical characteristics of each lens elements in the optical imaging lens 4 of the present embodiment, and please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 411 of the first lens element 410 to the image plane 460 along the optical axis may be about 11.95 mm and the image height of the optical imaging lens 4 may be about 2.112 mm.

FIG. 19 part (a) shows the longitudinal spherical aberration. From the vertical deviation of each curve shown in FIG. 19 part (a), the offset of the off-axis light relative to the image point may be within about ±0.0047 mm. Furthermore, the three curves having different wavelengths are closed to each other, and this situation represents that off-axis light with respect to these wavelengths may be focused around an image point, and the aberration can be improved obviously. FIGS. 19 part (b) and 19 part (c) respectively show the astigmatism aberration in the sagittal direction and astigmatism aberration in the tangential direction. Referring to FIG. 19 part (b), the focus variation with respect to the three different wavelengths (830 nm, 850 nm, 870 nm) in the whole field falls within about ±8.2 um. Referring to FIG. 19 part (c), the focus variation with respect to the three different wavelengths (830 nm, 850 nm, 870 nm) in the whole field falls within about ±10 um. Additionally, the three curves presenting different wavelengths are closed to each other, and these closed curves represents that the dispersion is improved. Please refer to FIG. 19 part (d), the variation of the distortion aberration of the optical imaging lens 4 may be within about ±70%.

Comparing with the first embodiment, the aberrations of the fourth embodiment may be smaller so the image quality may be better, and HFOV of the fourth embodiment may be bigger. Moreover, the yield of the fourth embodiment may be higher because the manufacturing process of the fourth embodiment may be easier.

Figure 22:
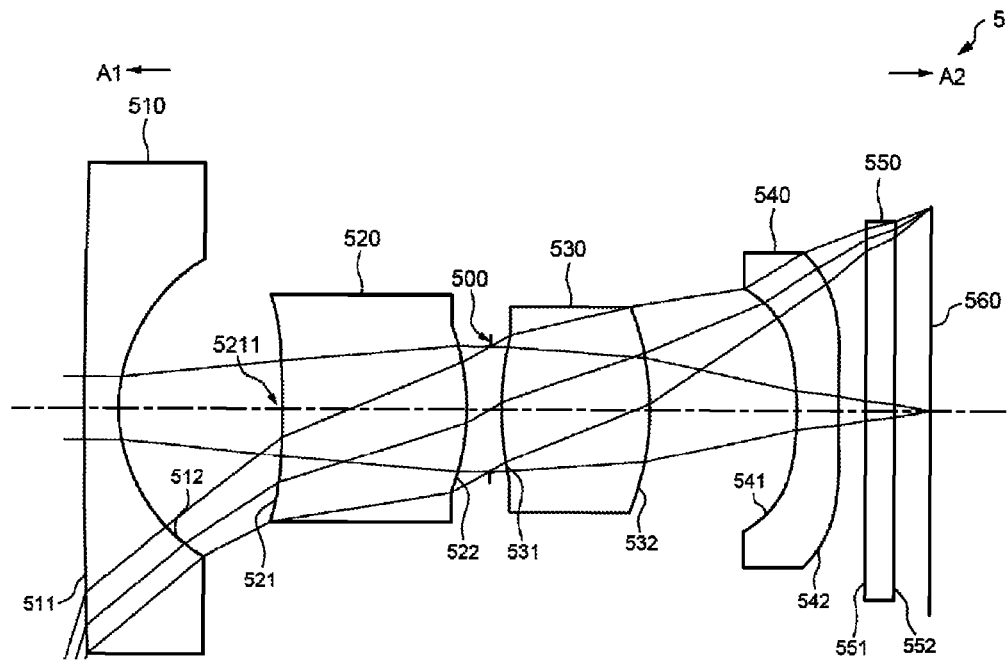
FIG. 22 is a cross-sectional view of a fifth embodiment of an optical imaging lens having four lens elements according to the present disclosure.
Figure 23:
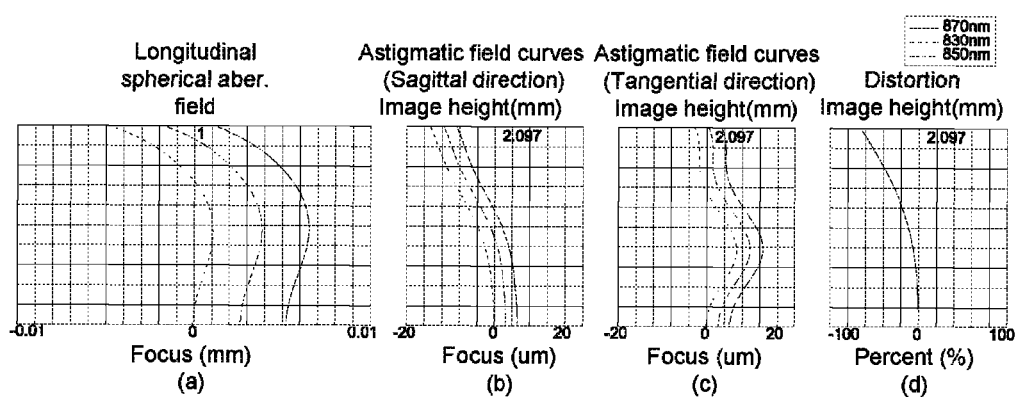
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having four lens elements of the optical imaging lens 5 according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment may comprise, in an order from an object side A1 to an image side A2 along an optical axis, a first lens element 510, a second lens element 520, an aperture stop 500, a third lens element 530, and a fourth lens element 540.

The configurations of the concave/convex shapes of surfaces comprising the object-side surfaces 511, 531, 541 facing to the object side A1 and the image-side surfaces 512, 522, 532, 542 facing to the image side A2, are similar to those in the first embodiment. The differences between the fifth embodiment and the first embodiment comprise the radius of curvature, the thickness of each lens element, the aspherical parameters of each lens element, the back focal length, and the shape of the object-side surface 5241. For clearly showing the drawings of the present embodiment, only the surface shapes which are different from those in the first embodiment are labeled. Specifically, the object-side surface 521 of the second lens element 520 may comprise a concave portion 5221 in a vicinity of the optical axis. FIG. 24 depicts the optical characteristics of each lens elements in the optical imaging lens 5 of the present embodiment, and please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present disclosure.

The distance from the object-side surface 511 of the first lens element 510 to the image plane 560 along the optical axis may be about 8.731 mm and the image height of the optical imaging lens 5 may be about 2.097 mm.

FIG. 23 part (a) shows the longitudinal spherical aberration of the first embodiment. From the vertical deviation of each curve shown in FIG. 23 part (a), the offset of the off-axis light relative to the image point may be within about ±0.007 mm. Furthermore, the three curves having different wavelengths are closed to each other, and this situation represents that off-axis light with respect to these wavelengths is focused around an image point, and the aberration can be improved obviously. FIG. 23 part (b) and 23 part (c) respectively show the astigmatism aberration in the sagittal direction and astigmatism aberration in the tangential direction. Referring to FIG. 23 part (b), the focus variation with respect to the three different wavelengths (830 nm, 850 nm, 870 nm) in the whole field may fall within about ±15 um. Referring to FIG. 23 part (c), the focus variation with respect to the three different wavelengths (830 nm, 850 nm, 870 nm) in the whole field may fall within about ±13 um. Additionally, the three curves presenting different wavelengths are closed to each other, and these closed curves represents that the dispersion is improved. Please refer to FIG. 23 part (d), the variation of the distortion aberration of the optical imaging lens 5 may be within about ±70%.

Comparing with the first embodiment, TTL of the fifth embodiment may be shorter, and the aberrations of the fourth embodiment may be smaller so the image quality may be better. Moreover, the yield of the fifth embodiment may be higher because the manufacturing process of the fifth embodiment may be easier.

Figure 26:
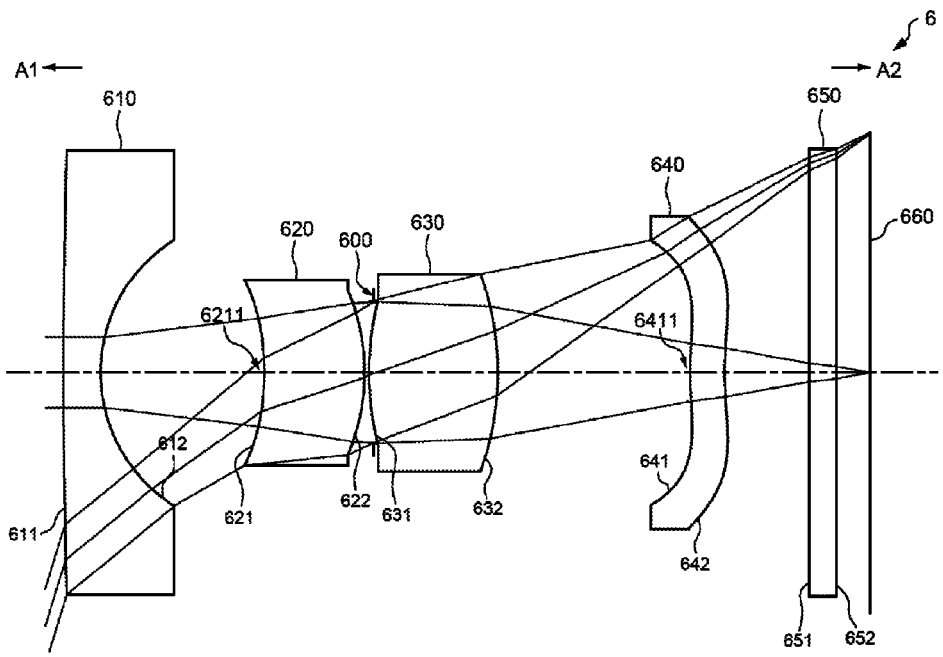
FIG. 26 is a cross-sectional view of a sixth embodiment of an optical imaging lens having four lens elements according to the present disclosure.
Figure 27:
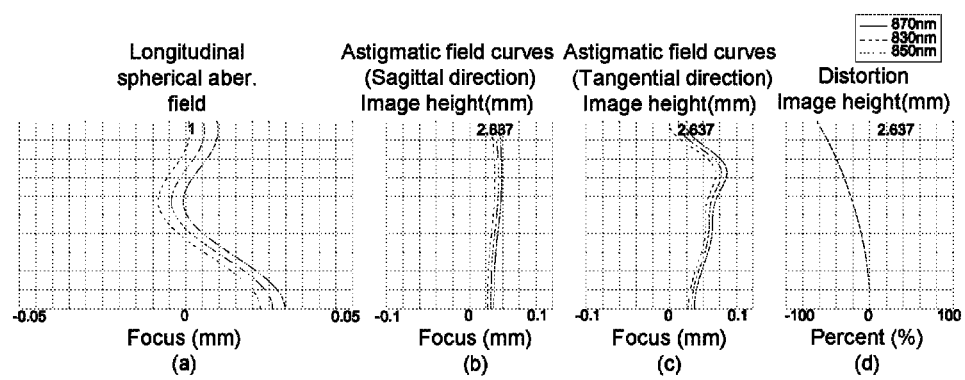
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having four lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment may comprise, in an order from an object side A1 to an image side A2 along an optical axis, a first lens element 610, a second lens element 620, an aperture stop 600, a third lens element 630, and a fourth lens element 640.

The configurations of the concave/convex shapes of surfaces comprising the object-side surfaces 611, 631 facing to the object side A1 and the image-side surfaces 612, 621, 632, 642 facing to the image side A2, are similar to those in the first embodiment. The differences between the sixth embodiment and the first embodiment comprise the radius of curvature, the thickness of each lens element, the aspherical parameters of each lens element, the back focal length, and the shapes of the object-side surfaces 621 and 641, For clearly showing the drawings of the present embodiment, only the surface shapes which are different from those in the first embodiment are labeled. Specifically, the object-side surface 621 of the second lens element 620 may comprise a concave portion 6221 in a vicinity of the optical axis, and the object-side surface 641 of the fourth lens element 640 may comprise a convex portion 6411 in a vicinity of the optical axis. FIG. 28 depicts the optical characteristics of each lens elements in the optical imaging lens 6 of the present embodiment. Please refer to FIG. 54A for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 611 of the first lens element 610 to the image plane 660 along the optical axis may be about 8.877 mm and the image height of the optical imaging lens 6 may be about 2.637 mm.

FIG. 27 part (a) shows the longitudinal spherical aberration. From the vertical deviation of each curve shown in FIG. 27 part (a), the offset of the off-axis light relative to the image point may be within about ±0.03 mm. Furthermore, the three curves having different wavelengths may be closed to each other, and this situation represents that off-axis light with respect to these wavelengths may be focused around an image point, and the aberration can be improved obviously. FIG. 27 part (b) and 27 part (c) respectively show the astigmatism aberration in the sagittal direction and astigmatism aberration in the tangential direction. Referring to FIG. 27 part (b), the focus variation with respect to the three different wavelengths (830 nm, 850 nm, 870 nm) in the whole field may fall within about ±0.04 mm. Referring to FIG. 27 part (c), the focus variation with respect to the three different wavelengths (830 nm, 850 nm, 870 nm) in the whole field may fall within about ±0.07 mm. Additionally, the three curves presenting different wavelengths may be closed to each other, and these closed curves may represent that the dispersion is improved. Please refer to FIG. 27 part (d), the variation of the distortion aberration of the optical imaging lens 6 may be within about +70%.

Comparing with the first embodiment, TTL of the sixth embodiment may be shorter. Moreover, the yield of the sixth embodiment may be higher because the manufacturing process of the sixth embodiment may be easier.

Figure 30:
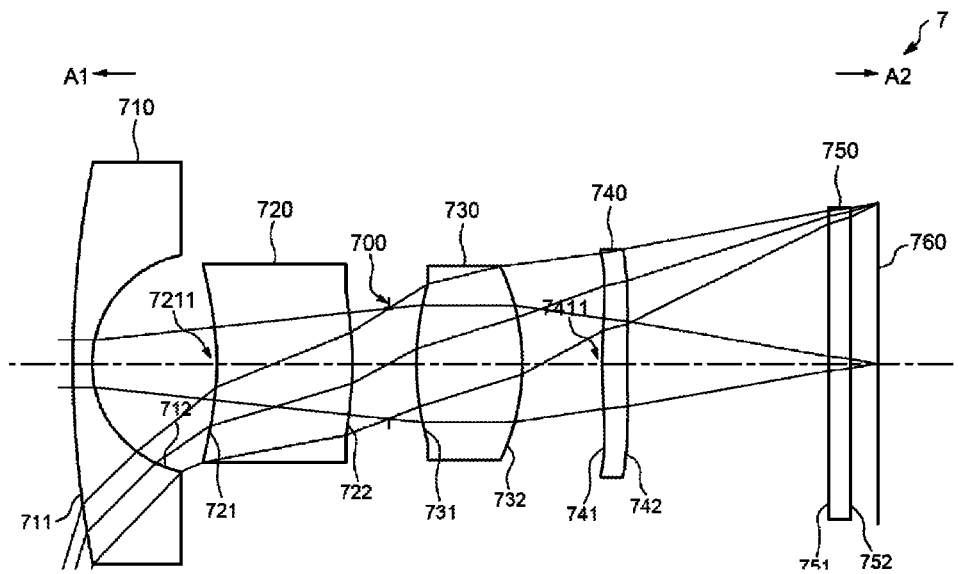
FIG. 30 is a cross-sectional view of a seventh embodiment of an optical imaging lens having four lens elements according to the present disclosure.
Figure 31:
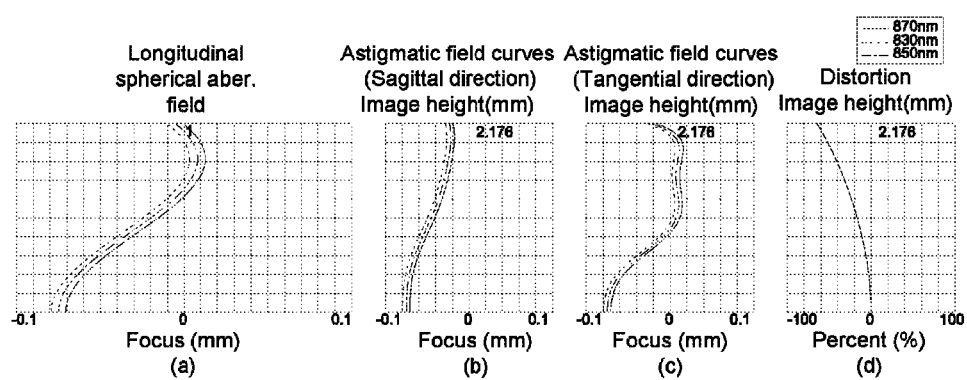
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having four lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment may comprise, in an order from an object side A1 to an image side A2 along an optical axis, a first lens element 710, a second lens element 720, an aperture stop 700, a third lens element 730, and a fourth lens element 740.

The configurations of the concave/convex shapes of surfaces comprising the object-side surfaces 711, 731 facing to the object side A1 and the image-side surfaces 712, 722, 732, 742 facing to the image side A2, are similar to those in the first embodiment. The differences between the seventh embodiment and the first embodiment comprise the radius of curvature, the thickness of each lens element, the aspherical parameters of each lens element, the back focal length, the shapes of the object-side surfaces 721, 741, and the retracting power of the fourth lens element 740. For clearly showing the drawings of the present embodiment, only the surface shapes which are different from those in the first embodiment are labeled. Specifically, the object-side surface 721 of the second lens element 720 may comprise a concave portion 7211 in a vicinity of the optical axis, the object-side surface 741 of the fourth lens element 740 may comprise a convex portion 7411 in a vicinity of the optical axis, and the fourth lens element 740 has a positive refracting power. FIG. 32 depicts the optical characteristics of each lens elements in the optical imaging lens 7 of the present embodiment, and please refer to FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 711 of the first lens element 710 to the image plane 760 along the optical axis may be about 10.906 mm and the image height of the optical imaging lens 7 may be about 2.176 mm.

FIG. 31 part (a) shows the longitudinal spherical aberration. From the vertical deviation of each curve shown in FIG. 31 part (a), the offset of the off-axis light relative to the image point may be within about ±0.08 mm. Furthermore, the three curves having different wavelengths may be closed to each other, and this situation may represent that off-axis light with respect to these wavelengths is focused around an image point, and the aberration can be improved obviously. FIG. 31 part (b) and 31 part (c) respectively show the astigmatism aberration in the sagittal direction and astigmatism aberration in the tangential direction. Referring to FIG. 31 part (b), the focus variation with respect to the three different wavelengths (830 nm, 850 nm, 870 nm) in the whole field may fall within about ±0.08 mm. Referring to FIG. 31 part (c), the focus variation with respect to the three different wavelengths (830 nm, 850 nm, 870 nm) in the whole field may fall within about ±0.08 mm. Additionally, the three curves presenting different wavelengths may be closed to each other, and these closed curves may represent that the dispersion is improved. Please refer to FIG. 31 part (d), the variation of the distortion aberration of the optical imaging lens 7 is within about ±70%.

Comparing with the first embodiment, HFOV of the seventh embodiment may be bigger, and the aperture stop 700 may be smaller. Moreover, the yield of the seventh embodiment may be higher because the manufacturing process of the seventh embodiment may be easier.

Figure 34:
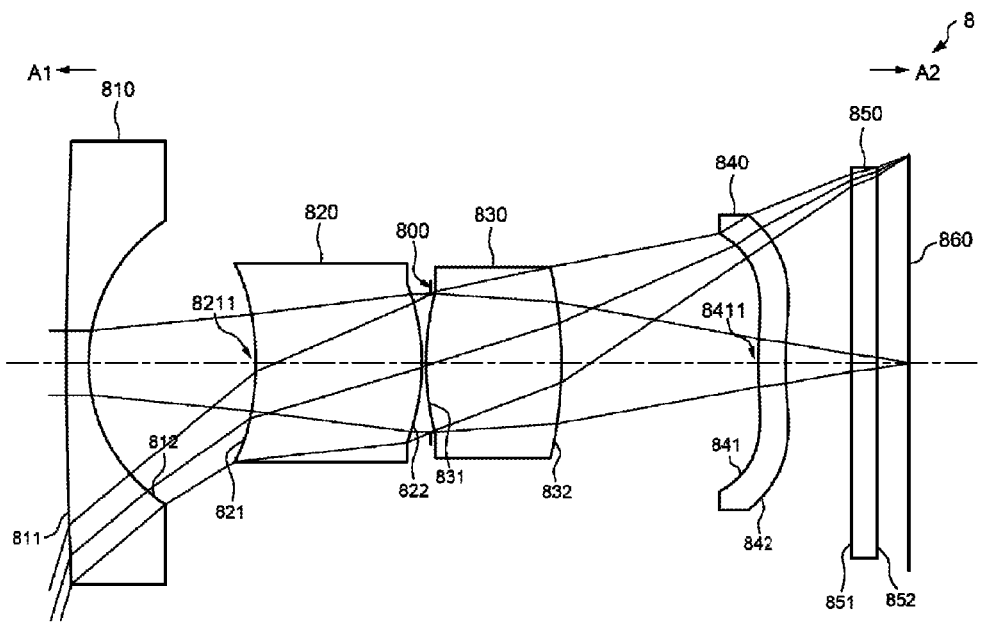
FIG. 34 is a cross-sectional view of a eighth embodiment of an optical imaging lens having four lens elements according to the present disclosure.
Figure 35:
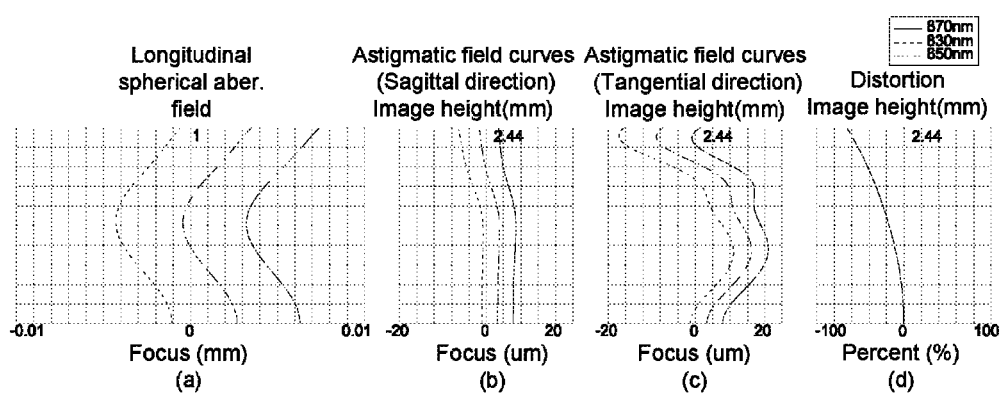
FIG. 35 is a chart of longitudinal spherical aberration and other kinds of optical aberrations of a eighth embodiment of the optical imaging lens according to the present disclosure.

Reference is now made to FIGS. 34-37. FIG. 34 illustrates an example cross-sectional view of an optical imaging lens 8 which may have four lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment may comprise, in an order from an object side A1 to an image side A2 along an optical axis, a first lens element 810, a second lens element 820, an aperture stop 800, a third lens element 830, and a fourth lens element 840.

The configurations of the concave/convex shapes of surfaces comprising the object-side surfaces 811, 831 facing to the object side A1 and the image-side surfaces, 812, 822, 832, 842 facing to the image side A2, are similar to those in the first embodiment. The differences between the eighth embodiment and the first embodiment comprise the radius of curvature, the thickness of each lens element, the aspherical parameters of each lens element, the back focal length, and the shapes of the object-side surfaces 821, 841. For clearly showing the drawings of the present embodiment, only the surface shapes which are different from those in the first embodiment are labeled. Specifically, the object-side surface 821 of the second lens element 820 may comprise a concave portion 8211 in a vicinity of the optical axis, and the object-side surface 841 of the fourth lens element 840 may comprise a convex portion 8411 in a vicinity of the optical axis. FIG. 36 depicts the optical characteristics of each lens elements in the optical imaging lens 8 of the present embodiment, and please refer to FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 811 of the first lens element 810 to the image plane 860 along the optical axis may be about 9.890 mm and the image height of the optical imaging lens 8 may be about 2.44 mm.

FIG. 35 part (a) shows the longitudinal spherical aberration. From the vertical deviation of each curve shown in FIG. 35 part (a), the offset of the off-axis light relative to the image point may be within about ±0.0075 mm. Furthermore, the three curves having different wavelengths may be closed to each other, and this situation may represent that off-axis light with respect to these wavelengths is focused around an image point, and the aberration can be improved obviously.

FIG. 35 part (b) and 35 part (c) respectively show the astigmatism aberration in the sagittal direction and astigmatism aberration in the tangential direction. Referring to FIG. 35 part (b), the focus variation with respect to the three different wavelengths (830 nm, 850 nm, 870 nm) in the whole field may fall within about ±7 um. Referring to FIG. 35 part (c), the focus variation with respect to the three different wavelengths (830 nm, 850 nm, 870 nm) in the whole field may fall within about ±19 um. Additionally, the three curves presenting different wavelengths may be closed to each other, and these closed curves may represent that the dispersion is improved. Please refer to FIG. 35 part (d), the variation of the distortion aberration of the optical imaging lens 8 may be within about ±70%.

Comparing with the first embodiment, the aberrations of the eighth embodiment may be smaller so the image quality may be better. Moreover, the yield of the eighth embodiment may be higher because the manufacturing process of the eighth embodiment may be easier.

Figure 38:
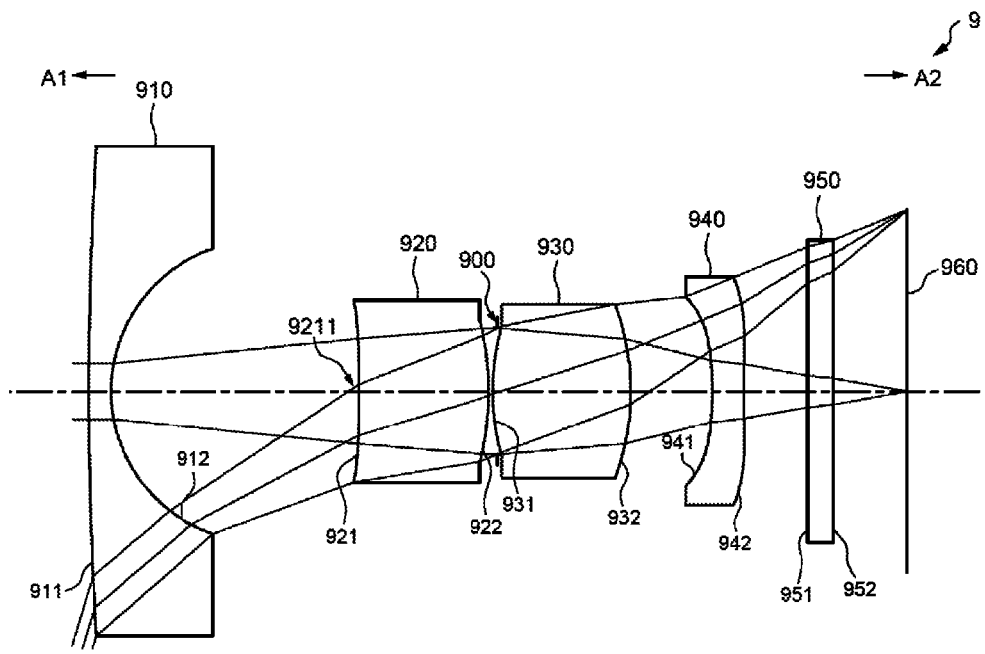
FIG. 38 is a cross-sectional view of a ninth embodiment of an optical imaging lens having four lens elements according to the present disclosure.
Figure 39:
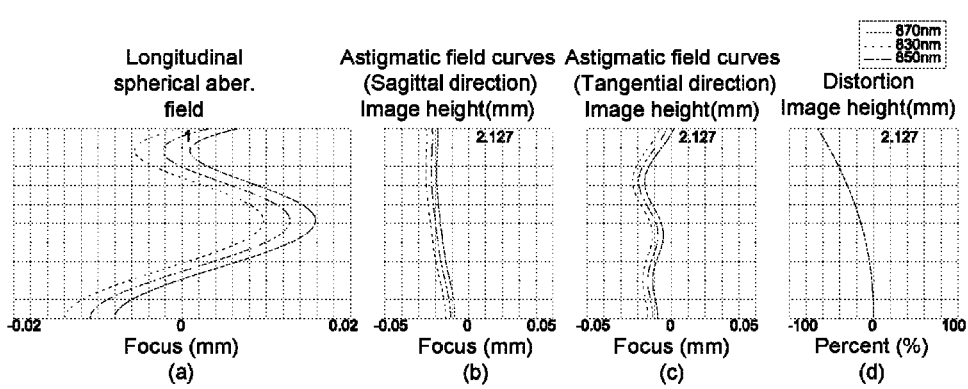
FIG. 39 is a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 which may have four lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment may comprise, in an order from an object side A1 to an image side A2 along an optical axis, a first lens element 910, a second lens element 920, an aperture stop 900, a third lens element 930, and a fourth lens element 940.

The configurations of the concave/convex shapes of surfaces comprising the object-side surfaces 911, 931, 941 facing to the object side A1 and the image-side surfaces, 912, 922, 932, 942 facing to the image side A2, are similar to those in the first embodiment. The differences between the ninth embodiment and the first embodiment comprise the radius of curvature, the thickness of each lens element, the aspherical parameters of each lens element, the back focal length, and the shape of the object-side surface 921. For clearly showing the drawings of the present embodiment, only the surface shapes which are different from those in the first embodiment are labeled. Specifically, the object-side surface 921 of the second lens element 920 may comprise a concave portion 9211 in a vicinity of the optical axis. FIG. 40 depicts the optical characteristics of each lens elements in the optical imaging lens 9 of the present embodiment, and please refer to FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 911 of the first lens element 910 to the image plane 960 along the optical axis may be about 9.591 mm and the image height of the optical imaging lens 9 may be about 2.127 mm.

FIG. 39 part (a) shows the longitudinal spherical aberration. From the vertical deviation of each curve shown in FIG. 39 part (a), the offset of the off-axis light relative to the image point may be within about ±0.016 mm. Furthermore, the three curves having different wavelengths may be closed to each other, and this situation may represent that off-axis light with respect to these wavelengths is focused around an image point, and the aberration can be improved obviously.

FIG. 39 part (b) and 39 part (c) respectively show the astigmatism aberration in the sagittal direction and astigmatism aberration in the tangential direction. Referring to FIG. 39 part (b), the focus variation with respect to the three different wavelengths (830 nm, 850 nm, 870 nm) in the whole field may fall within about ±0.03 mm. Referring to FIG. 39 part (c), the focus variation with respect to the three different wavelengths (830 nm, 850 nm, 870 nm) in the whole field may fall within about ±0.03 mm. Additionally, the three curves presenting different wavelengths may be closed to each other, and these closed curves may represent that the dispersion is improved. Please refer to FIG. 39 part (d), the variation of the distortion aberration of the optical imaging lens 9 may be within about +70%.

Comparing with the first embodiment, the yield of the ninth embodiment may be higher because the manufacturing process of the ninth embodiment may be easier.

Figure 42:
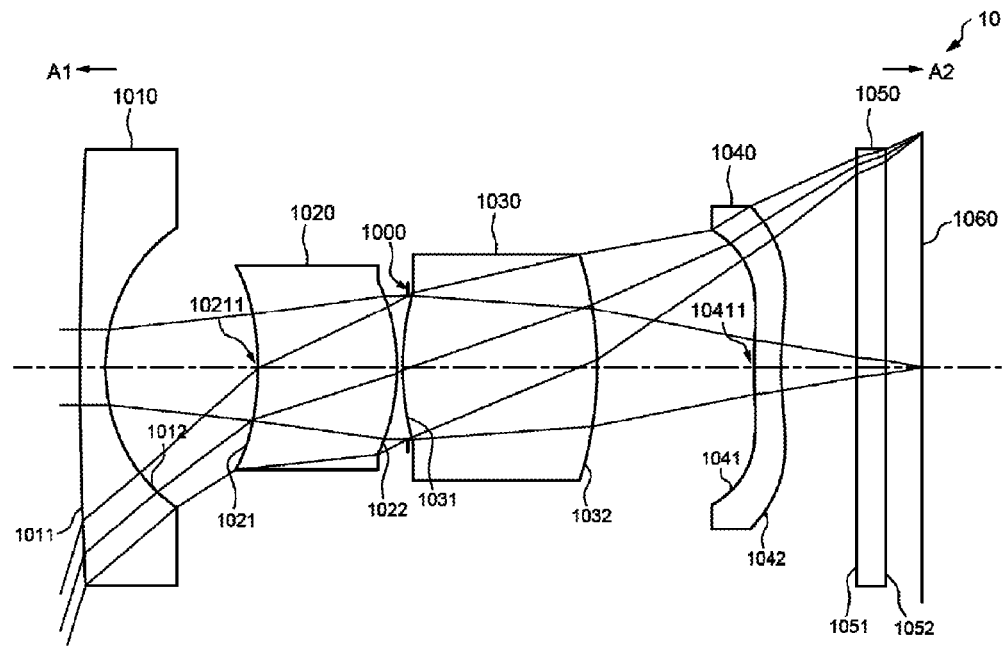
FIG. 42 is a cross-sectional view of a tenth embodiment of an optical imaging lens having four lens elements according to the present disclosure.
Figure 43:
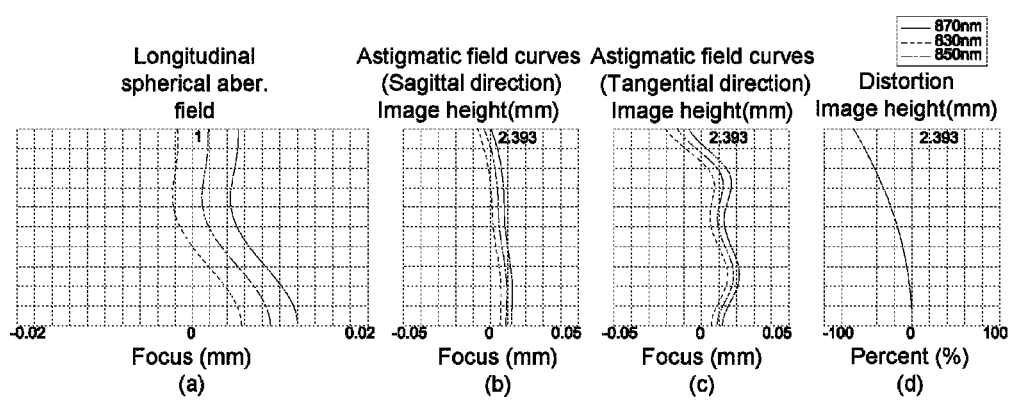
FIG. 43 is a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 which may have four lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment may comprise, in an order from an object side A1 to an image side A2 along an optical axis, a first lens element 1010, a second lens element 1020, an aperture stop 1000, a third lens element 1030, and a fourth lens element 1040.

The configurations of the concave/convex shapes of surfaces comprising the object-side surfaces 1011, 1031 facing to the object side A1 and the image-side surfaces, 1012, 1022, 1032, 1042 facing to the image side A2, are similar to those in the first embodiment. The differences between the tenth embodiment and the first embodiment comprise the radius of curvature, the thickness of each lens element, the aspherical parameters of each lens element, the back focal length, and the shapes of the object-side surfaces 1021 and 1041. For clearly showing the drawings of the present embodiment, only the surface shapes which are different from those in the first embodiment are labeled. Specifically, the object-side surface 1021 of the second lens element 1020 may comprise a concave portion 10211 in a vicinity of the optical axis, and the object-side surface 1041 of the fourth lens element 1040 may comprise a convex portion 10411 in a vicinity of the optical axis. FIG. 44 depicts the optical characteristics of each lens elements in the optical imaging lens 10 of the present embodiment, and please refer to FIG. 54 for the FIG. 54B values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 1011 of the first lens element 1010 to the image plane 1060 along the optical axis may be about 8.592 mm and the image height of the optical imaging lens 10 may be about 2.393 mm.

FIG. 43 part (a) shows the longitudinal spherical aberration. From the vertical deviation of each curve shown in FIG. 43 part (a), the offset of the off-axis light relative to the image point may be within about ±0.012 mm. Furthermore, the three curves having different wavelengths may be closed to each other, and this situation may represent that off-axis light with respect to these wavelengths is focused around an image point, and the aberration can be improved obviously. FIG. 43 part (b) and 43 part (c) respectively show the astigmatism aberration in the sagittal direction and astigmatism aberration in the tangential direction. Referring to FIG. 43 part (b), the focus variation with respect to the three different wavelengths (830 nm, 850 nm, 870 nm) in the whole field may fall within about ±0.015 mm. Referring to FIG. 43 part (c), the focus variation with respect to the three different wavelengths (830 nm, 850 nm, 870 nm) in the whole field may fall within about ±0.025 mm. Additionally, the three curves presenting different wavelengths may be closed to each other, and these closed curves may represent that the dispersion is improved. Please refer to FIG. 43 part (d), the variation of the distortion aberration of the optical imaging lens 10 may be within about ±70%.

Comparing with the first embodiment, TTL of the tenth embodiment may be shorter, and HFOV of the tenth embodiment may be bigger. Moreover, the yield of the tenth embodiment may be higher because the manufacturing process of the tenth embodiment may be easier.

Figure 46:
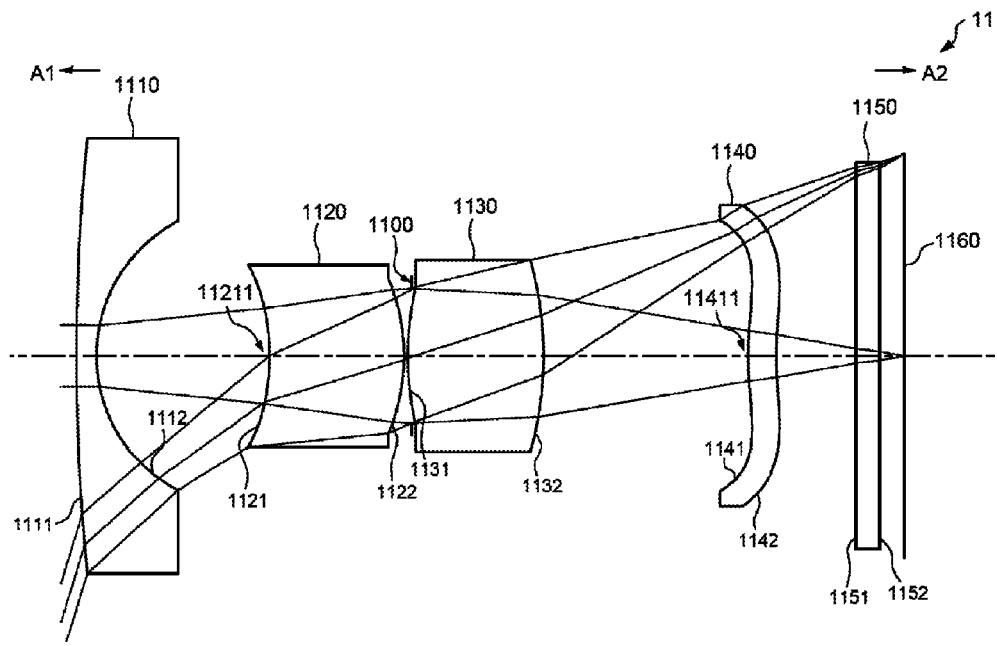
FIG. 46 is a cross-sectional view of a eleventh embodiment of an optical imaging lens having four lens elements according to the present disclosure.
Figure 47:
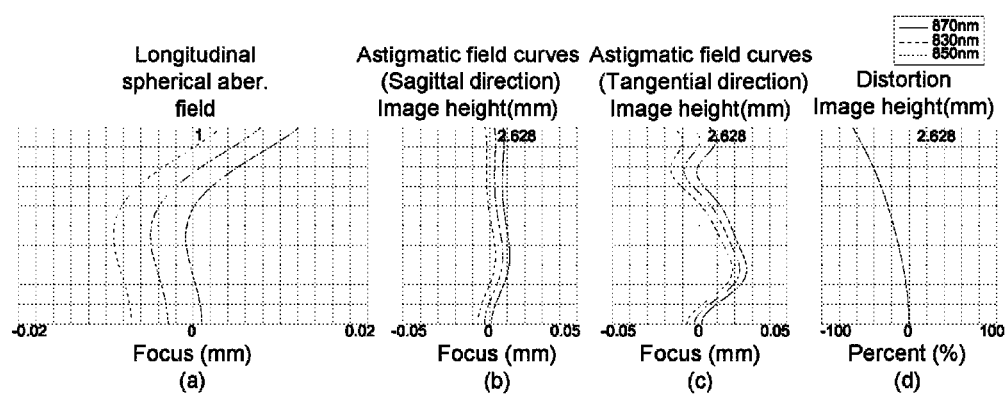
FIG. 47 is a chart of longitudinal spherical aberration and other kinds of optical aberrations of a eleventh embodiment of the optical imaging lens according to the present disclosure.

Reference is now made to FIGS. 46-49. FIG. 46 illustrates an example cross-sectional view of an optical imaging lens 11 which may have four lens elements of the optical imaging lens according to an eleventh example embodiment. FIG. 47 shows example charts of longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment may comprise, in an order from an object side A1 to an image side A2 along an optical axis, a first lens element 1110, a second lens element 1120, an aperture stop 1100, a third lens element 1130, and a fourth lens element 1140.

The configurations of the concave/convex shapes of surfaces comprising the object-side surfaces 1111, 1131 facing to the object side A1 and the image-side surfaces, 1112, 1122, 1132, 1142 facing to the image side A2, are similar to those in the first embodiment. The differences between the eleventh embodiment and the first embodiment comprise the radius of curvature, the thickness of each lens element, the aspherical parameters of each lens element, the back focal length, the shapes of the object-side surfaces 1121 and 1141, and the refracting power of the fourth lens element 1140. For clearly showing the drawings of the present embodiment, only the surface shapes which are different from those in the first embodiment are labeled. Specifically, the object-side surface 1121 of the second lens element 1120 may comprise a concave portion 11211 in a vicinity of the optical axis, the object-side surface 1141 of the fourth lens element 1140 may comprise a convex portion 11411 in a vicinity of the optical axis, and the fourth lens element 1140 has a positive refracting power. FIG. 48 depicts the optical characteristics of each lens elements in the optical imaging lens 11 of the present embodiment, and please refer to FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 1111 of the first lens element 1110 to the image plane 1160 along the optical axis may be about 10.755 mm and the image height of the optical imaging lens 11 may be about 2.628 mm.

FIG. 47 part (a) shows the longitudinal spherical aberration. From the vertical deviation of each curve shown in FIG. 47 part (a), the offset of the off-axis light relative to the image point may be within about ±0.012 mm. Furthermore, the three curves having different wavelengths may be closed to each other, and this situation may represent that off-axis light with respect to these wavelengths is focused around an image point, and the aberration can be improved obviously. FIG. 47 part (b) and 47 part (c) respectively show the astigmatism aberration in the sagittal direction and astigmatism aberration in the tangential direction. Referring to FIG. 47 part (b), the focus variation with respect to the three different wavelengths (830 nm, 850 nm, 870 nm) in the whole field may fall within about ±0.015 mm. Referring to FIG. 47 part (c), the focus variation with respect to the three different wavelengths (830 nm, 850 nm, 870 nm) in the whole field may fall within about ±0.02 mm. Additionally, the three curves presenting different wavelengths may be closed to each other, and these closed curves may represent that the dispersion is improved. Please refer to FIG. 47 part (d), the variation of the distortion aberration of the optical imaging lens 11 may be within about ±70%.

Comparing with the first embodiment, HFOV of the eleventh embodiment may be bigger. Moreover, the yield of the eleventh embodiment may be higher because the manufacturing process of the eleventh embodiment may be easier.

Figure 50:
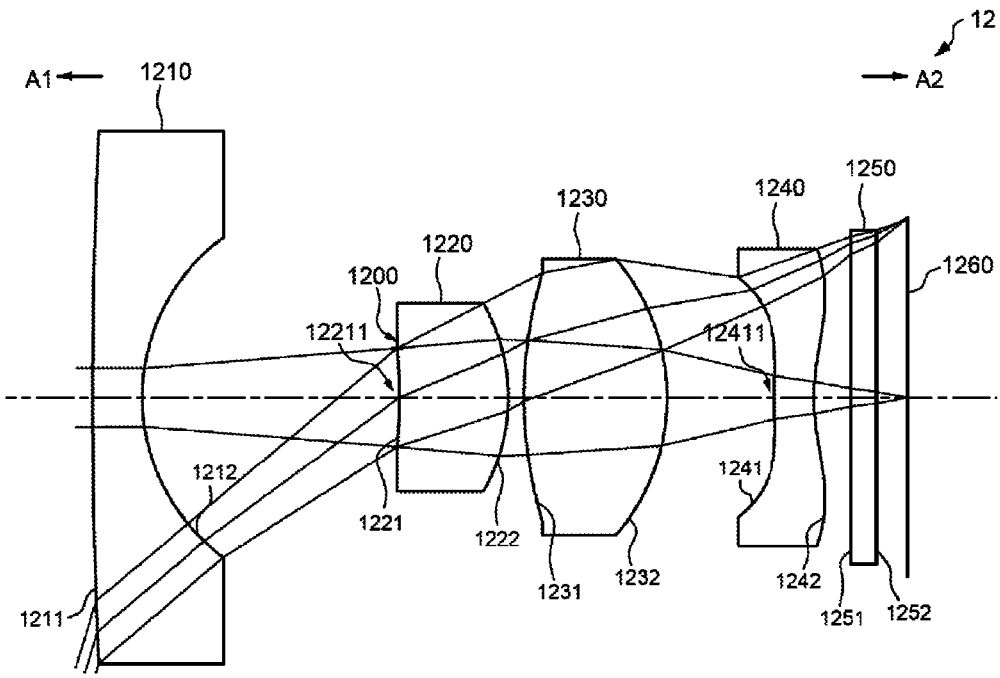
FIG. 50 is a cross-sectional view of a twelfth embodiment of an optical imaging lens having four lens elements according to the present disclosure.
Figure 51:
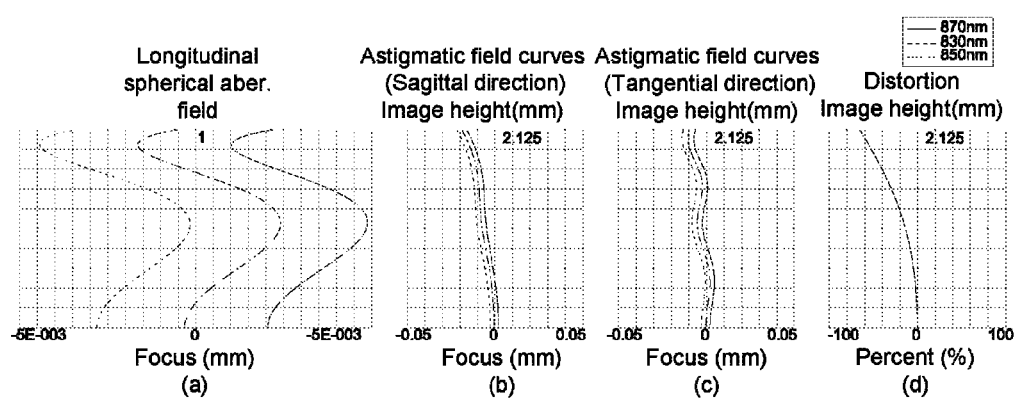
FIG. 51 is a chart of longitudinal spherical aberration and other kinds of optical aberrations of a twelfth embodiment of the optical imaging lens according to the present disclosure.

Reference is now made to FIGS. 50-53. FIG. 50 illustrates an example cross-sectional view of an optical imaging lens 12 which may have four lens elements of the optical imaging lens according to an twelfth example embodiment. FIG. 51 shows example charts of longitudinal spherical aberration and other kinds of optical aberrations of the optical imaging lens 12 according to the twelfth embodiment. FIG. 52 shows an example table of optical data of each lens element of the optical imaging lens 12 according to the twelfth example embodiment. FIG. 53 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 50, the optical imaging lens 12 of the present embodiment may comprise, in an order from an object side A1 to an image side A2 along an optical axis, a first lens element 1210, an aperture stop 1200, a second lens element 1220, a third lens element 1230, and a fourth lens element 1240.

The configurations of the concave/convex shapes of surfaces comprising the object-side surfaces 1211, 1231 facing to the object side A1 and the image-side surfaces, 1212, 1222, 1232, 1242 facing to the image side A2, are similar to those in the first embodiment. The differences between the twelfth embodiment and the first embodiment comprise the radius of curvature, the thickness of each lens element, the aspherical parameters of each lens element, the back focal length, and the shapes of the object-side surfaces 1221 and 1241. For clearly showing the drawings of the present embodiment, only the surface shapes which are different from those in the first embodiment are labeled. Specifically, the object-side surface 1221 of the second lens element 1220 may comprise a concave portion 12211 in a vicinity of the optical axis, and the object-side surface 1241 of the fourth lens element 1240 may comprise a convex portion 12411 in a vicinity of the optical axis. FIG. 52 depicts the optical characteristics of each lens elements in the optical imaging lens 12 of the present embodiment, and please refer to FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of the present embodiment.

The distance from the object-side surface 1211 of the first lens element 1210 to the image plane 1260 along the optical axis may be about 9.630 mm and the image height of the optical imaging lens 12 may be about 2.125 mm.

FIG. 51 part (a) shows the longitudinal spherical aberration. From the vertical deviation of each curve shown in FIG. 51 part (a), the offset of the off-axis light relative to the image point may be within about ±0.005 mm. Furthermore, the three curves having different wavelengths may be closed to each other, and this situation may represent that off-axis light with respect to these wavelengths is focused around an image point, and the aberration can be improved obviously. FIG. 51 part (b) and 51 part (c) respectively show the astigmatism aberration in the sagittal direction and astigmatism aberration in the tangential direction. Referring to FIG. 51 part (b), the focus variation with respect to the three different wavelengths (830 nm, 850 nm, 870 nm) in the whole field may fall within about ±0.025 mm. Referring to FIG. 51 part (c), the focus variation with respect to the three different wavelengths (830 nm, 850 nm, 870 nm) in the whole field may fall within about ±0.015 mm. Additionally, the three curves presenting different wavelengths may be closed to each other, and these closed curves may represent that the dispersion is improved. Please refer to FIG. 51 part (d), the variation of the distortion aberration of the optical imaging lens 12 may be within about ±70%.

Comparing with the first embodiment, the aberrations of the twelfth embodiment are smaller so the image quality may be better, the position of the aperture stop 1200 may be different, and HFOV of the twelfth embodiment may be bigger. Moreover, the yield of the twelfth embodiment may be higher because the manufacturing process of the twelfth embodiment may be easier.

Please refer to FIG. 54A and FIG. 54B for the values of T1, G12, T2, G23, T3, G34, T4, G4C, TC, GCP, AAG, ALT, BFL, TTL, EFL, TL, ALT/AAG, G34/BFL, TTL/EFL, G12/T2, ALT/G34, and TL/G34 of all twelve embodiments.

According to above illustration, it is clear that the optical imaging lens thereof in example embodiments, through controlling the detail structure of the lens elements and an inequality, the length of the optical imaging lens is effectively shortened and meanwhile good optical characteristics are still provided.

Because the image-side surface of the first lens element is a concave surface in a vicinity of the optical axis, the first lens element can help the optical imaging lens to gather lights.

Because the second lens element has a positive refracting power, the second lens element can increase an angle of view.

Because the object-side surface of the third lens element has a convex surface in a vicinity of a periphery of the third lens element and the image-side surface of the third lens element has a convex surface in a vicinity of a periphery of the third lens element and the image-side surface of the fourth lens element has a concave surface in a vicinity of the optical axis, the third and fourth lens elements can correct aberrations caused by the first and second lens elements and promote the image quality of the optical imaging lens.

Via the characteristics of the four lens elements described above, TTL can be shorten, the image quality can be ensured, the image resolution for a part of the object can be upgrading, and the angle of field of view can be increased.

Moreover, the optical imaging lens has perfect optical performances and TTL may be shorten efficiently through controlling several parameter described below.

In order to shortening the length of the optical imaging lens, the thicknesses of lens elements and air gaps should be shorten appropriately. However, if the difficulty of assembling the optical imaging lens and the imaging quality must be considered by a designer, G12, T2, TL, AAG may be designed to satisfy these equations described below: G12/T2≤4.7 or 0.2≤G12/T2≤4.7 is better; TL/G12≤4.6 or 2.5≤TL/G12≤4.6 is better; AAG/G12≤2.2 or 1.1≤AAG/G12≤2.2; AAG/T2≤3.8 or 1.8≤AAG/T2≤3.8; TL/T2≤6.6 or 4.1≤TL/T2≤6.6.

The ratio of TTL to EFL should be maintain appropriately. If the ratio of TTL to EFL is too big, TTL may be too long. Therefore, TTL, EFL, G34 may be designed to satisfy these equations described below: TTL/EFL≤6.4 or 1.1≤TTL/EFL≤6.4 is better; TTL/G34≤10.1 or 3.1≤TTL/G34≤10.1 is better.

In order to reducing aberrations caused by the first and second lens elements, G12, T3, TL, T2, G34 may be designed to satisfy these equations described below: G12/T3≤1.8 or 0.1≤G12/T3≤1.8 is better; TL/T3≤5.3 or 3.6≤TL/T3≤5.3 is better; T3/T2≤1.4 or 0.7≤T3/T2≤1.4 is better; T3/G34≤1.7 or 0.4≤T3/G34≤1.7 is better.

When EFL is shorten, the angle of field of view may be increased. Therefore, the angle of field of view may be increased if EFL and BFL may be designed to satisfy these equations described below: EFL/BFL≤2.1 or 0.4≤EFL/BFL≤2.1 is better.

In order to reducing the difficulties of manufacturing and designing the optical imaging lens, T2 and G34 may be designed to satisfy these equations described below: T2/G34≤1.9 or 0.2≤T2/G34≤1.9.

In order to upgrading the imaging quality of the optical imaging lens, uniforming the image brightness, reducing aberrations and difficulties of manufacturing and designing the optical imaging lens, G34, BFL, ALT, TL, AAG may be designed to satisfy these equations described below: G34/BFL≤1.6 or 0.04≤G34/BFL≤1.6 is better; ALT/G34≤8.3 or 1.4≤ALT/G34≤8.3 is better; TL/G34≤14.2 or 2.5≤TL/G34≤14.2 is better; G12/G34≤3.2 or 0.08≤G12/G34≤3.2 is better; AAG/G34≤5.8 or 1.1≤AAG/G34≤5.8 is better.

In order to reducing aberrations caused by the first and second lens elements, AAG and T3 may be designed to satisfy these equations described below: AAG/T3≤52.8 or 1.4≤AAG/T3≤2.8 is better.

If a designer needs to correct aberrations without increasing ALT, ALT and AAG may be designed to satisfy these equations described below: ALT/AAG≤1.25 or 0.7≤ALT/AAG≤1.25 is better.

The length and volume of the optical imaging lens are decreased when ALT, AAG, G34, BFL, TTL, EFL, G12, T2, TL, and T3 are designed to satisfy these equations described below: ALT/AAG≤1.25; G34/BFL≤1.6; TTL/EFL≤6.4; G12/T2≤4.7; ALT/G34≤8.3; TL/G34≤14.2; T2/G34≤1.9; EFL/BFL≤2.1; G2/T3≤1.8; G12/G34≤3.2; AAG/G34≤5.8; TL/G12≤4.6; AAG/G12≤2.2; AAG/T3≤2.8; AAG/T2≤3.8; TL/T3≤5.3; TTL/G34≤10.1; T3/T2≤1.4; T3/G34≤1.7; TL/T2≤6.6.

The imaging quality of the optical imaging lens may be better when ALT, AAG, G34, BFL, TTL, EFL, G12, T2, TL, and T3 are designed to satisfy these equations described below: 0.7≤ALT/AAG≤1.25; 0.04≤G34/BFL≤1.6; 1.1≤TTL/EFL≤6.4; 0.2≤G12/T2≤4.7; 1.4≤ALT/G34≤8.3; 2.5≤TL/G34≤14.2; 0.2≤T2/G34≤1.9; 0.4≤EFL/BFL≤2.1; 0.1≤G12/T3≤1.8; 0.08≤G12/G34≤3.2; 1.1≤AAG/G34≤5.8; 2.5≤TL/G12≤4.6; 1.1≤AAG/G12≤2.2; 1.4≤AAG/T3≤2.8; 1.8≤AAG/T2≤3.8; 3.6≤TL/T3≤5.3; 3.1≤TTL/G34≤10.1; 0.7≤T3/T2≤1.4; 0.4≤T3/G34≤1.7; 4.1≤TL/T2≤6.6.

Because the performance of the optical imaging lens can't be expected, the length of the optical imaging lens can be shorten, the aperture stop is bigger, the angle of field of view is increased, the imaging quality is upgrading, the assembling yield is promoted to improve drawbacks of prior arts when ALT, AAG, G34, BFL, TTL, EFL, G12, T2, TL, and T3 are designed to satisfy these equations described below: ALT/AAG≤1.25; G34/BFL≤1.6; TTL/EFL≤6.4; G12/T2≤4.7; ALT/G34≤8.3; TL/G34≤14.2; T2/G34≤1.9; EFL/BFL≤2.1; G12/T3≤1.8; G12/G34≤3.2; AAG/G34≤5.8; TL/G12≤4.6; AAG/G12≤2.2; AAG/T3≤2.8; AAG/T2≤3.8; TL/T3≤5.3; TTL/G34≤10.1; T3/T2≤1.4; T3/G34≤1.7; TL/T2≤6.6.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure set out in any claims that may issue from this disclosure. Specifically, a description of a technology in the "Background" is not to be construed as an admission that technology is prior art to this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, and fourth lens elements, each of the first, second, third, and fourth lens elements having a refracting power, an object-side surface facing toward the object side and an image-side surface facing toward the image side and a central thickness defined along an optical axis, wherein:
   the image-side surface of the first lens element comprises a concave portion in a vicinity of the optical axis;
   the second lens element has a positive refracting power;
   the object-side surface of the third lens element comprises a convex portion in a vicinity of a periphery of the third lens element, the image-side surface of said third lens element comprises a convex portion in a vicinity of a periphery of the third lens element;
   the image-side surface of the fourth lens element comprises a concave portion in a vicinity of the optical axis and a convex portion in a vicinity of a periphery of the fourth lens element;
   a sum of a central thicknesses of all four lens elements along the optical axis is represented by ALT, an air gap between the first lens element and the second lens element along the optical axis is represented by G12, an air gap between the second lens element and the third lens element along the optical axis is represented by G23, an air gap between the third lens element and the fourth lens element along the optical axis is represented by G34, a sum of G12, G23, and G34 is represented by AAG, ALT and AAG satisfy the equation: ALT/AAG≤1.25;
   a central thickness of the third lens element is represented by T3, G12 and T3 satisfy the equation: G12/T3≤1.8; and
   wherein the optical imaging lens comprises no other lenses having refracting power beyond the first, second, third, and fourth lens elements.

2. The optical imaging lens according to claim 1, wherein a distance from the image-side surface of the fourth lens element to an image plane along the optical axis is represented by BFL, G34 and BFL satisfy the equation: G34/BFL≤1.6.

3. The optical imaging lens according to claim 1, wherein a distance between the object-side surface of the first lens element and an image plane along the optical axis is represented by TTL, an effective focal length of the optical imaging lens is represented by EFL, TTL and EFL satisfy the equation: TTL/EFL≤6.4.

4. The optical imaging lens according to claim 1, wherein a central thickness of the second lens element is represented by T2, G12 and T2 satisfy the equation: G12/T2≤4.7.

5. The optical imaging lens according to claim 1, wherein ALT and G34 satisfy the equation: ALT/G34≤8.3.

6. The optical imaging lens according to claim 1, wherein a distance between the object-side surface of the first lens element and the image-side surface of the fourth lens element along the optical axis is represented by TL, TL and G34 satisfy the equation: TL/G34≤14.2.

7. The optical imaging lens according to claim 1, wherein a central thickness of the second lens element is represented by T2, T2 and G34 satisfy the equation: T2/G34≤1.9.

8. The optical imaging lens according to claim 1, wherein an effective focal length of the optical imaging lens is represented by EFL, a distance from the image-side surface of the fourth lens element to an image plane along the optical axis is represented by BFL, EFL and BFL satisfy the equation: EFL/BFL≤2.1.

9. The optical imaging lens according to claim 1, wherein G12 and G34 satisfy the equation: $G12/G34 \leq 3.2$.

10. The optical imaging lens according to claim 1, wherein AAG and G34 satisfy the equation: $AAG/G34 \leq 5.8$.

11. The optical imaging lens according to claim 1, wherein a distance between the object-side surface of the first lens element and the image-side surface of the fourth lens element along the optical axis is represented by TL, TL and G12 satisfy the equation: $TL/G12 \leq 4.6$.

12. The optical imaging lens according to claim 1, wherein AAG and G12 satisfy the equation: $AAG/G12 \leq 2.2$.

13. The optical imaging lens according to claim 1, wherein AAG and T3 satisfy the equation: $AAG/T3 \leq 2.8$.

14. The optical imaging lens according to claim 1, wherein a central thickness of the second lens element is represented by T2, AAG and T2 satisfy the equation: $AAG/T2 \leq 3.8$.

15. The optical imaging lens according to claim 1, wherein a distance between the object-side surface of the first lens element and the image-side surface of the fourth lens element along the optical axis is represented by TL, TL and T3 satisfy the equation: $TL/T3 \leq 5.3$.

16. The optical imaging lens according to claim 1, wherein a distance between the object-side surface of the first lens element and an image plane along the optical axis is represented by TTL, TTL and G34 satisfy the equation: $TTL/G34 \leq 10.1$.

17. The optical imaging lens according to claim 1, wherein a central thickness of the second lens element is represented by T2, T2 and T3 satisfy the equation: $T3/T2 \leq 1.4$.

18. The optical imaging lens according to claim 1, wherein T3 and G34 satisfy the equation: $T3/G34 \leq 1.7$.

19. The optical imaging lens according to claim 1, wherein a distance between the object-side surface of the first lens element and the image-side surface of the fourth lens element along the optical axis is represented by TL, a central thickness of the second lens element is represented by T2, TL and T2 satisfy the equation: $TL/T2 \leq 6.6$.

* * * * *